(12) United States Patent
Bustamante

(10) Patent No.: US 12,626,679 B2
(45) Date of Patent: May 12, 2026

(54) PORTABLE PASSIVE SOUND AMPLIFIER WITH POWER BANK SYSTEM

(71) Applicant: BT5 Technologies LLC, Katy, TX (US)

(72) Inventor: Luis Bustamante, The Woodlands, TX (US)

( * ) Notice: Subject to any disclaimer, the term of this patent is extended or adjusted under 35 U.S.C. 154(b) by 0 days.

(21) Appl. No.: 18/421,586

(22) Filed: Jan. 24, 2024

(65) Prior Publication Data

US 2024/0321253 A1 Sep. 26, 2024

Related U.S. Application Data

(60) Provisional application No. 63/442,992, filed on Feb. 2, 2023.

(51) Int. Cl.
| | |
|---|---|
| *H04R 1/30* | (2006.01) |
| *G10K 11/08* | (2006.01) |
| *H02J 7/00* | (2006.01) |
| *H02J 50/10* | (2016.01) |
| *H04B 1/3877* | (2015.01) |

(52) U.S. Cl.
CPC ............ *G10K 11/08* (2013.01); *H02J 7/0044* (2013.01); *H02J 50/10* (2016.02)

(58) Field of Classification Search
CPC ......... G10K 11/08; G10K 11/02; H02J 50/10; H02J 50/00; H02J 7/0044; H02J 7/00; H02J 7/0042; H02J 7/02; H04R 1/02; H04R 1/30; H05K 5/0247; H05K 5/0217; G06F 1/16; G06F 1/1632; G06F 1/1613; H04M 1/04; H04M 1/035; H04B 1/3877; H04B 1/3827
See application file for complete search history.

(56) References Cited

U.S. PATENT DOCUMENTS

| | | | | |
|---|---|---|---|---|
| 8,170,259 B2* | 5/2012 | Liu | ........................... | H04R 1/02 |
| | | | | 381/388 |
| 8,483,420 B2* | 7/2013 | Kim | ........................ | H04R 1/30 |
| | | | | 381/337 |
| 8,522,917 B1* | 9/2013 | Oh | ........................ | G10K 11/08 |
| | | | | 181/175 |
| 9,241,055 B1* | 1/2016 | Barker | .................... | H04M 1/04 |
| 9,628,597 B1* | 4/2017 | Andersen | .............. | G06F 1/1632 |
| 9,874,902 B2* | 1/2018 | McCracken | .......... | G06F 1/1632 |

(Continued)

FOREIGN PATENT DOCUMENTS

| | | | | |
|---|---|---|---|---|
| CN | 111866635 A | * | 10/2020 | ............ H02J 50/005 |
| KR | 101403765 B1 | * | 6/2014 | |

(Continued)

*Primary Examiner* — Edgardo San Martin
(74) *Attorney, Agent, or Firm* — Joseph P. Aiena

(57) ABSTRACT

There is provided a hub device having a unitary body with walls located on top, bottom, front, rear, and a pair of side walls defining a cavity within the unitary body which has an internal power source and a set of electronics for wireless and wired power charge capabilities. The front wall has an opening for receiving a base piece into the cavity of the unitary body, with the base piece having a bottom surface and a locking ridge extending from the bottom surface. The unitary body has a U-type or other types of sound tubes extending from an interior top surface of the top wall into the cavity, defining an acoustic pathway and having a front output grill surface to allow the amplified sound waves exit from the unitary body.

16 Claims, 30 Drawing Sheets

(56)                    References Cited

U.S. PATENT DOCUMENTS

| | | | |
|---|---|---|---|
| 10,114,416 B1 * | 10/2018 | D'Penha | G06F 1/1632 |
| 10,291,762 B2 * | 5/2019 | Andersen | H04N 7/142 |
| 10,348,351 B2 * | 7/2019 | Rivera | H04B 1/3877 |
| 11,570,917 B2 * | 1/2023 | Bustamante | G06F 1/1632 |
| 2010/0183179 A1 * | 7/2010 | Griffin, Jr. | H04R 1/30 |
| | | | 381/337 |
| 2024/0321253 A1 * | 9/2024 | Bustamante | H02J 50/10 |

FOREIGN PATENT DOCUMENTS

| | | | | |
|---|---|---|---|---|
| KR | 101514447 | B1 | * | 4/2015 |
| KR | 20150002835 | U | * | 7/2015 |
| KR | 101673551 | B1 | * | 11/2016 |
| KR | 102093518 | B1 | * | 3/2020 |
| KR | 102493709 | B1 | * | 1/2023 |
| KR | 20240086687 | A | * | 6/2024 |

* cited by examiner

| Freq | GAIN (dB) Sound Tube ( Figs. 7C and 7D) | GAIN (dB) Sound Tube (Figs. 7G and 7H) | GAIN (dB) Sound Tube (Figs. 7E and 7F) |
|---|---|---|---|
| 200 | 20 | 0 | -2 |
| 300 | 12 | 10 | 12 |
| 400 | 12 | 16 | 6 |
| 500 | 20 | 8 | 14 |
| 700 | 26 | 22 | 16 |
| 1K | 22 | 20 | 18 |
| 2K | 20 | 6 | 4 |
| 5K | 0 | 4 | 6 |
| 10K | 0 | -2 | -2 |
| 15K | 6 | 4 | 0 |
| 20K | 4 | 0 | -4 |
| Average among 300 - 1K | 18,4 | 15,2 | 13,2 |

1255

1265

1270

1260

1250

1247

1325

1320

1335

1340

1345

1350

1330

1355

1600

1605

A

1610

B

PORTABLE PASSIVE SOUND AMPLIFIER WITH POWER BANK SYSTEM

CROSS REFERENCE TO RELATED APPLICATIONS

This application claims priority to and benefit of U.S. Provisional Application Ser. No. 63/442,992 filed on Feb. 2, 2023 and incorporated by reference herein in its entirety.

FIELD OF THE INVENTION

The present invention relates generally to a portable passive or electrical sound amplifier with a power bank system and hub capabilities for operation with one or two hands.

BACKGROUND

There are sound amplifiers, generally electrical, with portable batteries that have been used for years to charge devices. In addition, there are accessories with large structures to mechanically increase the volume of phones, many users use their internal speaker to play music or stream content on their phones without any sound amplification or the ability to have access to powered amplification. Increasing the soundstage of a phone without the use of auxiliary powered or Bluetooth connection is highly desirable for quick connection or non-powered environment available. There is a need for a new solution that provides users with a portable power bank, a device that charges phones, amplifies sound without consuming power, or with electrical speakers, to be used with cellphones and deployed with one or both hands in four positions, and all of this packed into a small case that can be used at home, and personally carried by users in a jacket, or backpack, or purse, etc, when they leave home.

SUMMARY OF THE INVENTION

The present invention provides the user with a new type of portable passive sound amplifier, with a power bank and a hub with connectivity and capabilities for enhanced performance and entertainment in any place, and especially when traveling. With the present invention, the hub has extended functionality within the apparatus as a unitary system or with attachments. This invention charges phones, tablets, among other apparatuses, wired or wireless, has ports to charge other apparatuses, increase the volume passively without consuming power from the power bank or from the cellphone, and it can be used in different applications such as personal use, to enhance the entertainment or work anywhere.

the present invention relates to a hub with multi-functional capabilities for power bank, wireless and wired charging connectivity, a special thin sound tube that utilizes compression technology, that captures and guides the soundwaves through a specialized horn design to increase the sound pressure level (SPL) and improve acoustic response for passive sound amplification, and a mechanical slot to connect smartphones and other apparatuses in a unique, portable and small piece of technology.

The internal structure of this invention is designed to house a specially designed thin sound tube, a rechargeable battery, a wireless charging antenna, USB-C power input and USB-A power output ports, a flexible charging cover, a stand for vertical tilted, or horizontal tilted, or landscape, or screen facing up positions, and electronic boards and connectors of the latest technology that manage, interface and/or detect the power obtained from the power source, and charge apparatuses such as a computer, phones, tablets, etc. It can also include speakers, data transfer capabilities among other features.

The present invention is a portable hub system which comprises a unitary hub device with an internal power source with the unitary device housing a set of electronics for wireless and wired communications with a computer and other apparatuses. This invention has input buttons to activate internal components and software to transfer power, with a computer, phones, and other apparatuses simultaneously. The device of the present invention includes a port to install phones and other apparatuses for power charging. This invention has a small special thin sound tube specially designed to fit into a small frame which increases the decibels of the connected phones or other apparatuses. This invention includes a mechanical connection on a top surface, and the mechanical connection is capable of securing a functional object and electronically transferring power and the sound waves into this invention's sound tube.

BRIEF DESCRIPTION OF DRAWINGS

Some embodiments of the invention, and of making and using the invention, as well as the best mode contemplated of carrying out the invention, are described in detail below, by way of example, with reference to the accompanying drawings, in which like reference characters designate like elements throughout the several views, and in which.

Figures 26A, 26B, 26C:
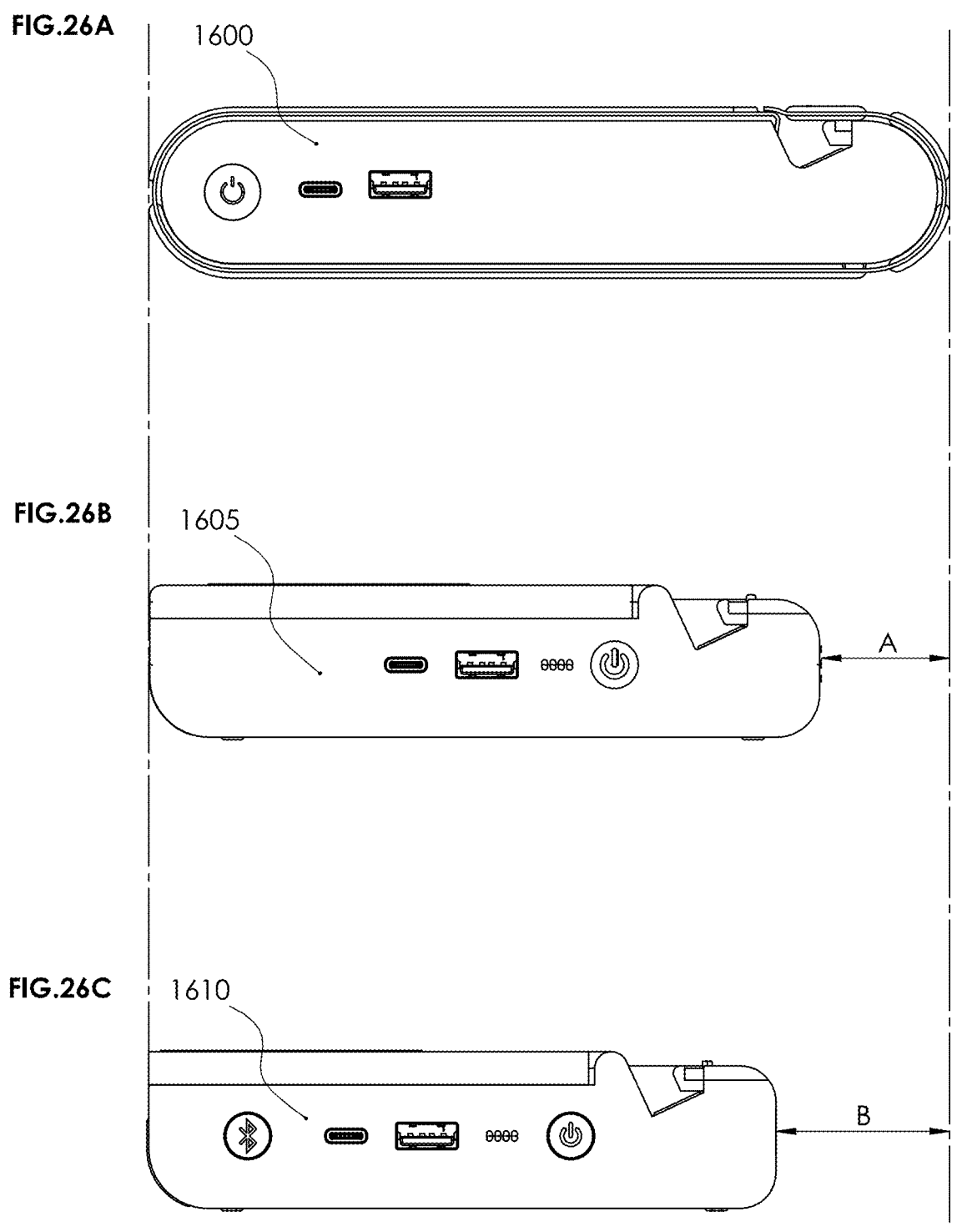

The FIGS. 26A, 26B, and 26C show the size comparison of the different versions of this invention described herein.

DETAILED DESCRIPTION OF THE DRAWINGS

Figure 1A:
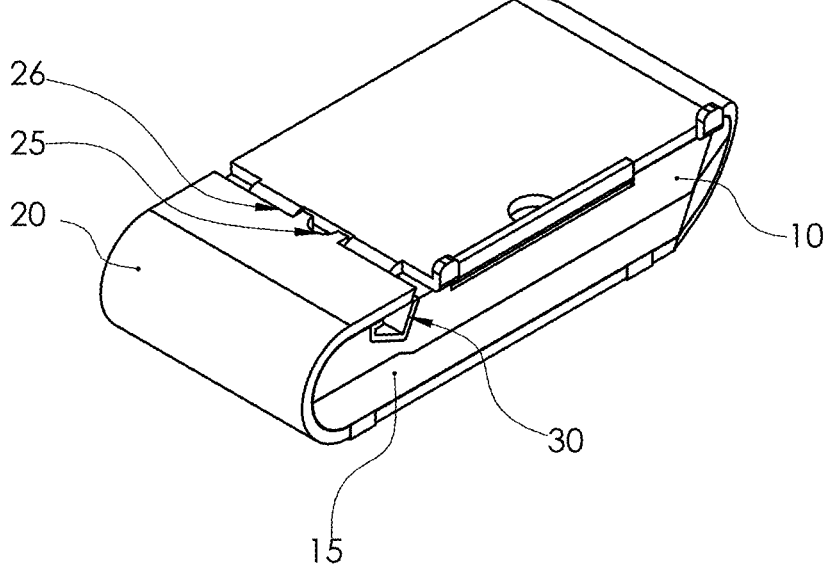
FIG. 1A and FIG. 1B show top and bottom isometric front views, respectfully, of the present invention with the outer charging cover folded.
Figure 1B:
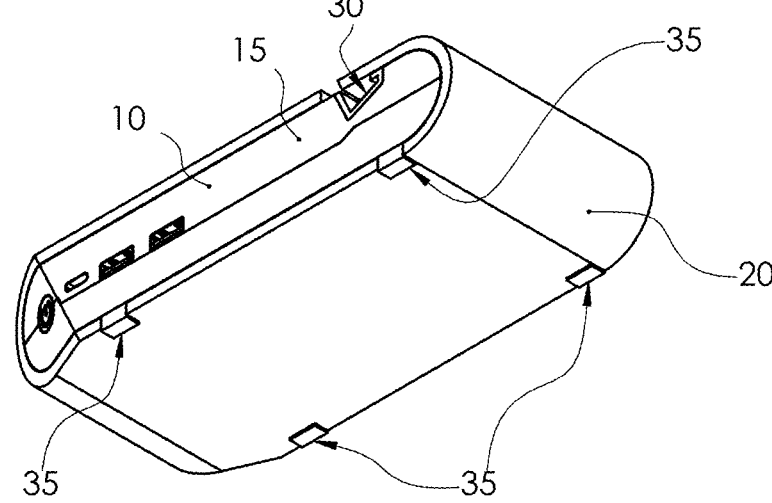

The present invention shall be described with reference to the included Figures and charts. FIG. 1A shows a top isometric view of this invention 10, which is made up of a main body 15 that contains a battery and all the electronic components that allow devices such as smartphones to be charged wired and/or wirelessly, in addition to the specially designed thin sound tube that amplifies the decibels of the sound waves of the device placed in the support slot 30. This invention has a protective outer charging cover 20 made of a flexible material that surrounds the main body 15. The outer charging cover 20 includes an opening tab 25 at its end 26 that facilitates its deployment. FIG. 1B shows a lower isometric view where the non-slip pads 35 improve the fixation of this invention 10 with the surface on which it is placed.

Figure 2A:
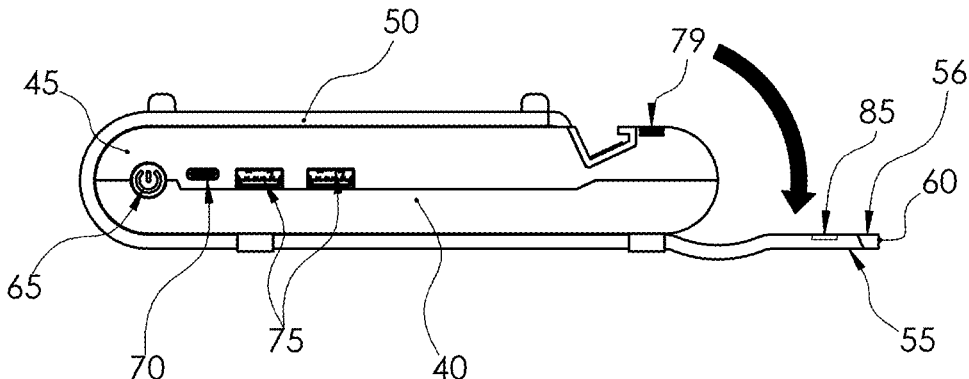
FIG. 2A and FIG. 2B illustrate in a left side view, the first two steps of the unfolding sequence of the outer charging cover of the present invention.
Figure 2B:
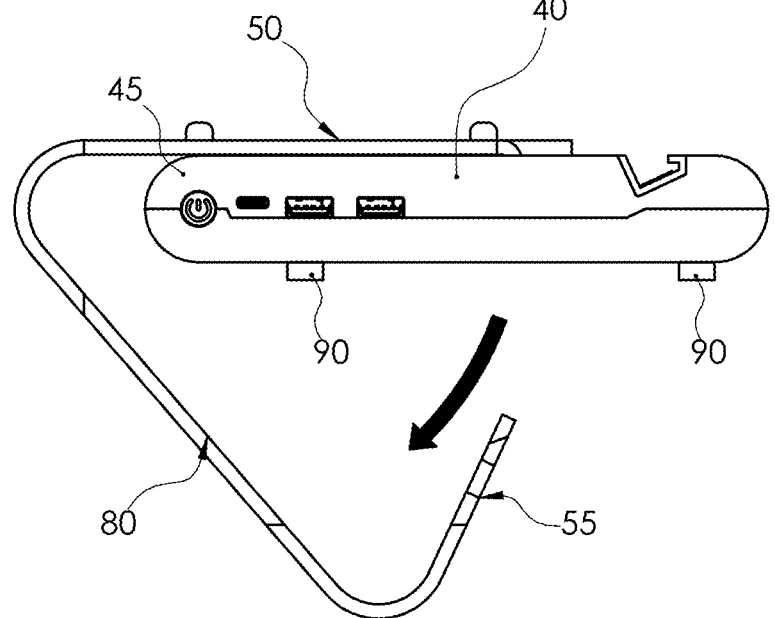

FIG. 2A and FIG. 2B show the deployment sequence of the outer charging cover 50 of this invention 40. In FIG. 2A shows how first section 55 of the outer charging cover 50 is unfolded, by pulling on the front end 56 where the opening tab 60 is located, pulling on this opening tab 60 separates the metal plates 79 on the main body 45 and the magnets 85 that secure the outer charging cover 50 in the closed position. FIG. 2B shows the deployment of second section 80 of the outer charging cover 50, exposing the non-slip pads 90 located in the main body 45 of this invention 40. In these views it can be seen that on left side of the main body 45, are located the on/off button 65, the USB-C or similar type of port 70 for power input, that allows to charge the battery located inside of this invention 40, and 2 or more USB-A or similar type of ports 75 for output of energy that allows charging other devices that are connected by cable.

Figure 3:
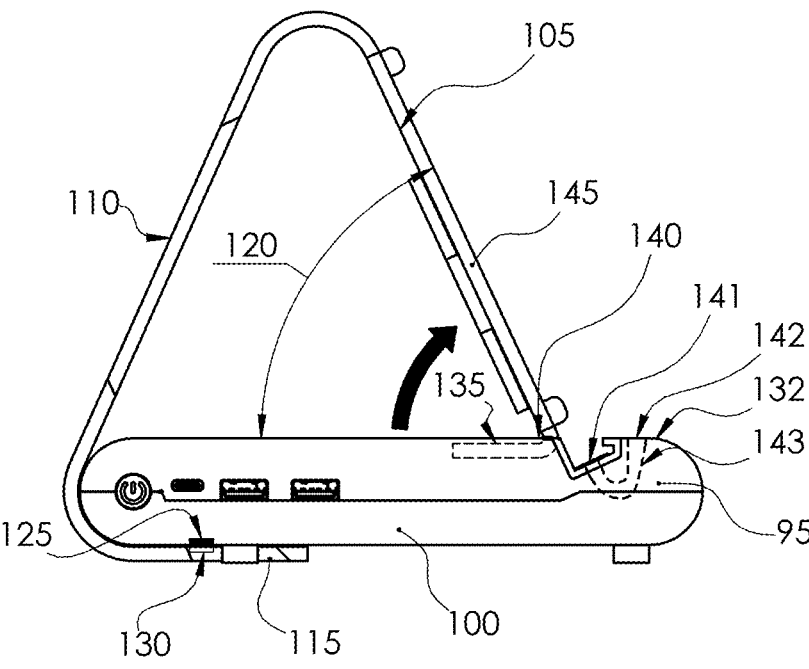
FIG. 3 is a left side view, showing the third step of the unfolding sequence of the outer charging cover of this invention.

FIG. 3 shows a left side view of this invention 95 with the outer charging cover 105 fully unfolded. Section 4 135 of the outer charging cover 105 is fixed inside the main body 100 of this invention 95, and due to the flexibility of its raw material, it rotates on an axis 140 allowing section 1 115, section 2 110, and the section 3 145 of the outer charging cover 105 form a triangle that serves as a support to place a smartphone, tablet or other similar device on this invention 95. The magnets 130 of the section 1 115 of the outer charging cover 105 are joined with the metal plates 125 included in the lower part of the main body 100 of this invention 95 to keep the outer charging cover 105 in the unfolded position. When unfolding the outer charging cover 105, the section 3 145 where the device (tablet or smartphone) rests in an angle of approximately 65° 120 with respect to the horizontal which allows a comfortable viewing of the device by the user. A voice input port 142 is included on the top front 132 of this invention 95, which connects to a hole 141 located in the support slot (30 in FIGS. 1A and 1B) via a conduit 143. The hole 141 aligns with the microphone of the smartphone installed in this invention 95 and allows the user's sound or voice to be clearly perceived.

Figure 4A:
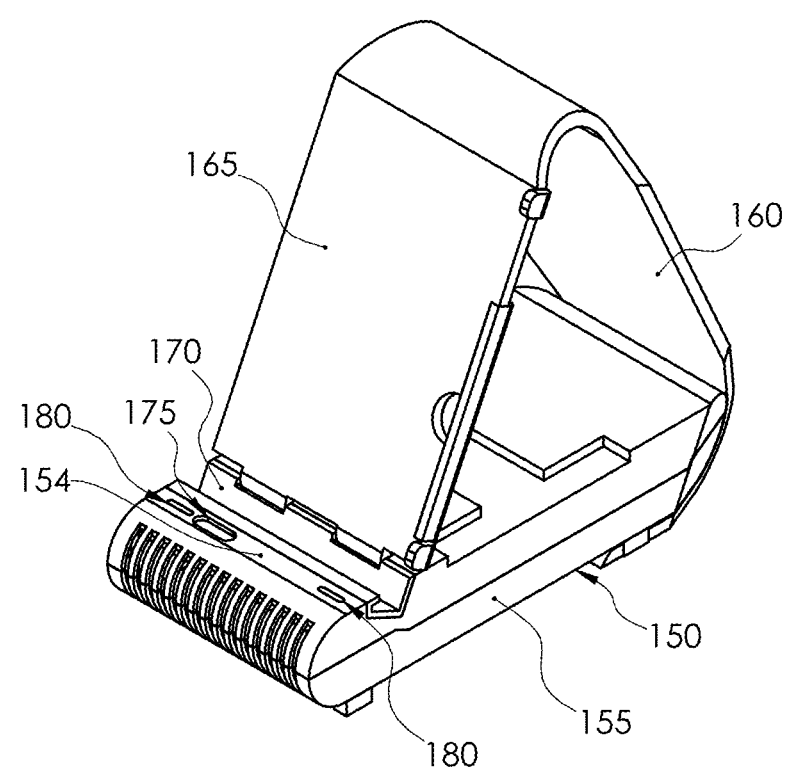
FIG. 4A is a top isometric view of this invention with the outer charging cover unfolded and ready to install a smartphone on it.
Figure 4B:
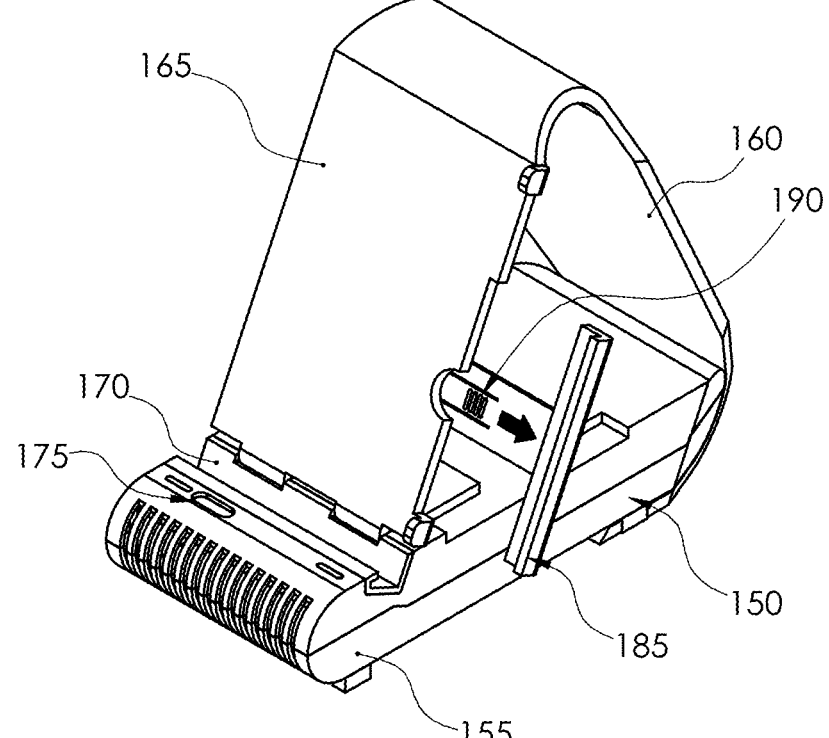
FIG. 4B is a bottom isometric view showing the lateral telescopic support arm extended for the landscape visualization mode.

In FIG. 4A an isometric view of this invention 150 is shown with the outer charging cover 160 in the unfolded position and ready to place the smartphone, tablet or other similar device on it. The smartphone or other device can be installed in the support slot 170 located in the main body 155 of this invention 150, Said smartphone or other device is supported by the section 3 165 of the outer charging cover 160 at an angle of approximately 65° over the horizontal. On the upper front part 154 of the main body 155, the metal plates 180 that hold the outer charging cover 160 to keep it closed, and the voice input port 175 are seen. FIG. 4B is the isometric view of this invention 150 showing the lateral telescoping arm 185 in the extended position. This lateral telescopic arm 185 serves as a support to place this invention 150 in horizontal tilted position, and elevate the phone to a height of approximately 35 to 50 mm from the base [for instance, over a desk], allowing to adjust the tilt position from 90° to about 65° with respect to the base. To store the telescopic arm 185, it is necessary to press the release button 190 and push it into the outer charging cover 160.

Figure 5A:
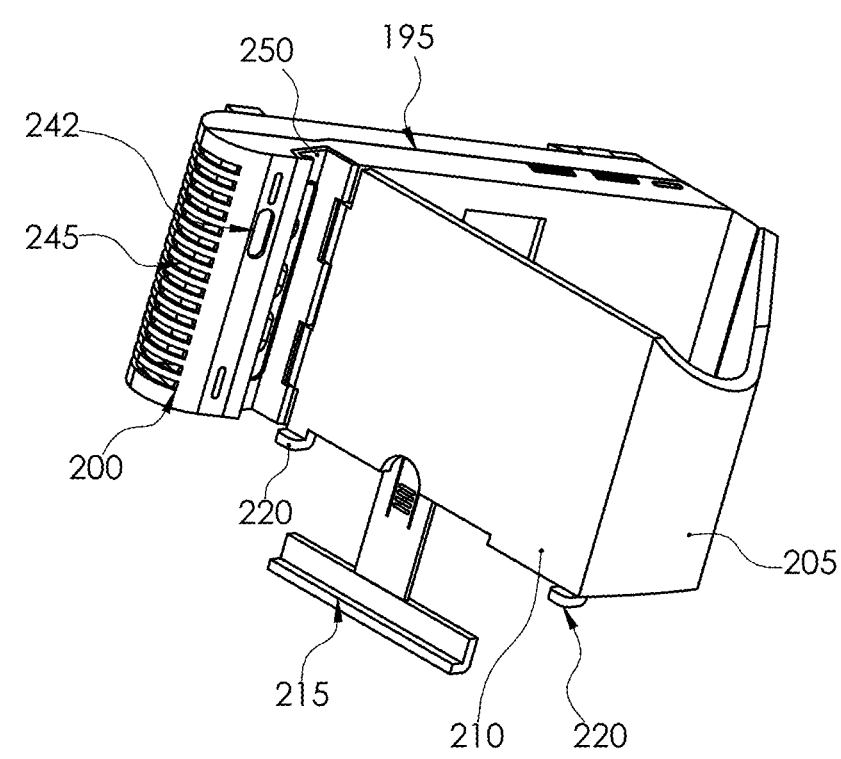
FIG. 5A is an isometric view of this invention placed in a horizontal tilted position.
Figure 5B:
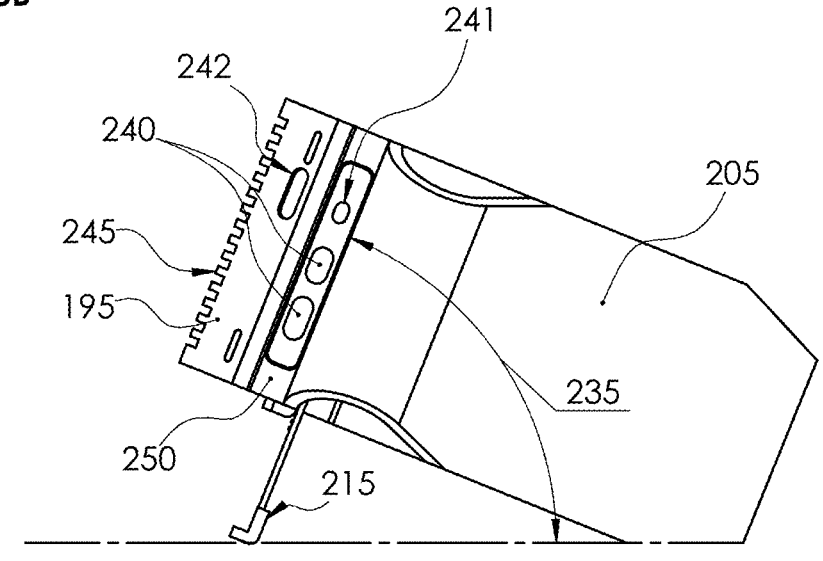
FIG. 5B is a right-side view showing the viewing angle in horizontal tilted position.

The FIG. 5A shows an isometric view of this invention 195 with the outer charging cover 205 unfolded and placed in a tilt position. The smartphone is installed in the support slot 250 located in the main body 200 and is supported in the back by the section 3 210 of the outer charging cover 205 and from the bottom by the support pins 220 placed on the side edge of the outer charging cover 205. In the support slot 250 there are the one or more input holes 240, as prefer just one input holes, through which the sound waves emitted by the smartphones or other apparatuses enters a special thin sound tube 270 (described in FIG. 6) from the speaker of the smartphone, and the sound waves are amplified through its traveling into the sound tube (270 in FIG. 6) and exit through the front grille 245. In the support slot 250 there is also the microphone hole 241 through which the sound conducted from the voice input hole 242 of the upper front part of this invention comes out, directly to the microphone of the smartphone installed in this invention 195, to maintain a clear reception of the voice and the sound in case of making a video call. The FIG. 5B is a left side view of this invention where it is shown how the telescopic arm 215 works as a support in tilt position and allows adjusting the angle of the phone at different angles, starting from 90° versus the horizontal (or desk), to an adjustable tilt position of approximately 65° 235 above the horizontal to give the user different options of view.

Figure 6:
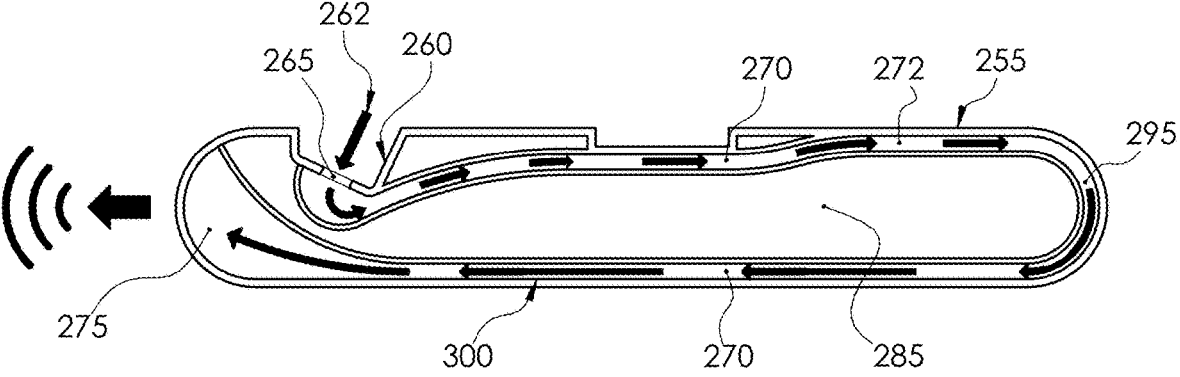
FIG. 6 is a right-side view indicating the path of the sound tube included this invention.

FIG. 6 is a left side view of this invention 255 where it is observed how the sound waves 262 that comes from a device such as a smartphone, enters through the input holes 265 located in the support slot 260, and travels along the sound tube 270. This sound tube 270, leads the sound waves from the input holes 265 and directs them to travel through the sound tube top 272 of this invention 255 and extends towards the rear part 295 where it makes a 180° turn and returns to the front along the sound tube bottom 300 of said sound tube 270, this path increases the magnitude in decibels of the sound to later be amplified by the output grille 275 on the front part. Inside this invention 255 there is the compartment 285 where there is a rechargeable battery (see 365 on FIG. 8), connecting ports, and the PCB (see 370 on FIG. 8) that manage the power recharge functions.

Figure 7A:
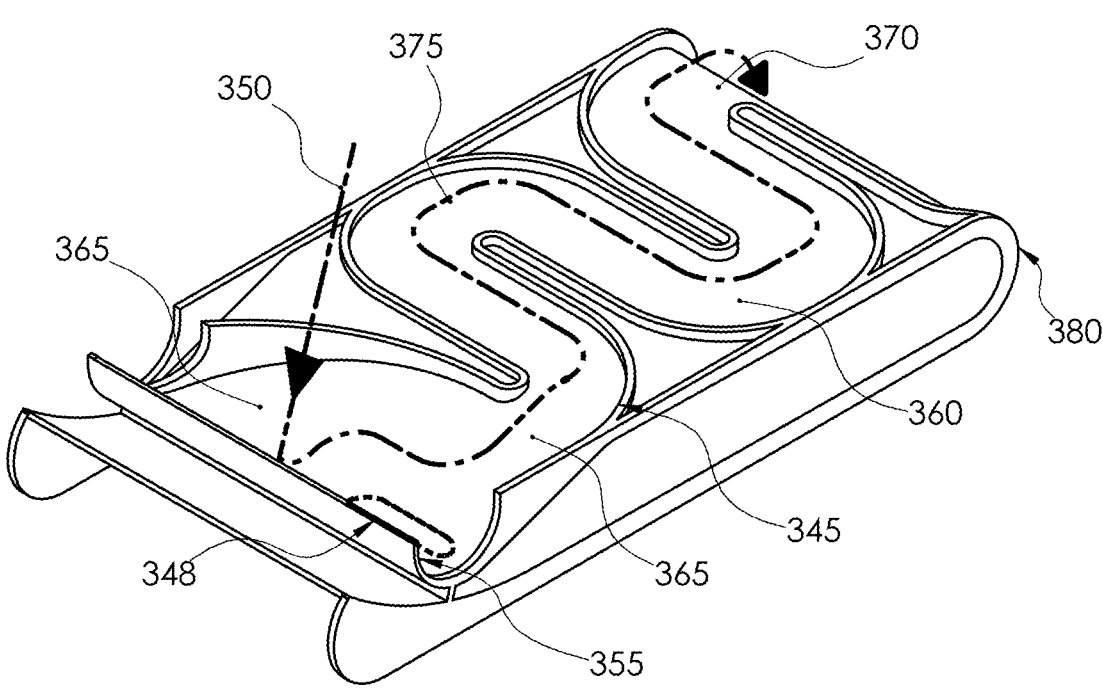
FIG. 7A and FIG. 7B are the isometrics top and bottom views, respectively, showing a zig zag-type sound tube included in this invention.
Figure 7B:
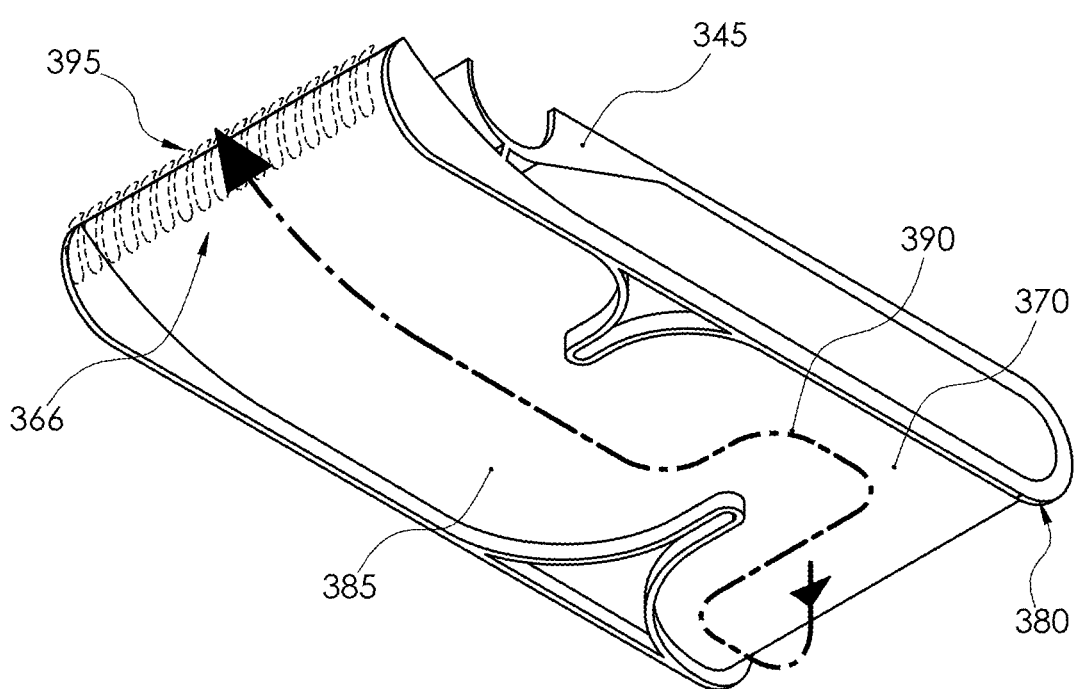

The FIGS. 7A and 7B. show how the sound waves from the speaker of the smartphone or other device connected to the sound input port enter to the sound tube 345 through the input holes 348, located on the support base (see 260 in FIG. 6) of this invention, at a downward angle of approximately 65° 350, and touching the curved or flat inner wall 355 in the upper section 360 of the sound tube 345, driving said waves inward and directing them through the conduit from the front 365 to the rear 370 in a zig-zag path in the top 375, where the tube makes a 180° turn 380 connecting the upper part 360 with the lower part 385 of the sound tube 345, and thus the sound waves are returned in a zig-zag path in the bottom 390 from behind 370 forward 365 to be ejected through the outlet grille 395 at the front area 366. The wave path within the sound tube 345 can be from 400 mm to 600 mm in length, having 500 mm as preferred, and has dimensions of approximately 22 mm wide by 3 mm high average along the path. At outlet grill 395, sound tube 345 is maximally flared to have an end opening of approximately 60 to 100 mm wide with 78 mm being preferred, and tube wall height of 15 mm to 35 mm with preferred. 22.5 mm high.

Figure 7C:
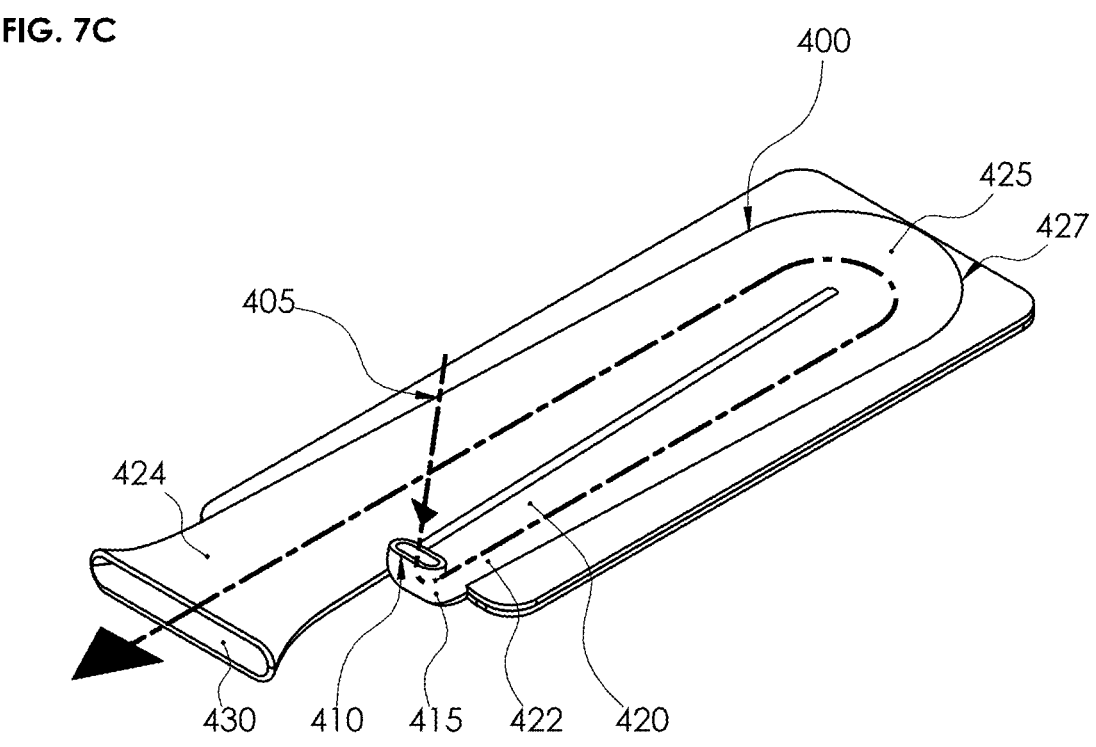
FIG. 7C and FIG. 7D are the isometrics top and bottom views, respectively, showing the option of the U-type sound tube included in this invention.
Figure 7D:
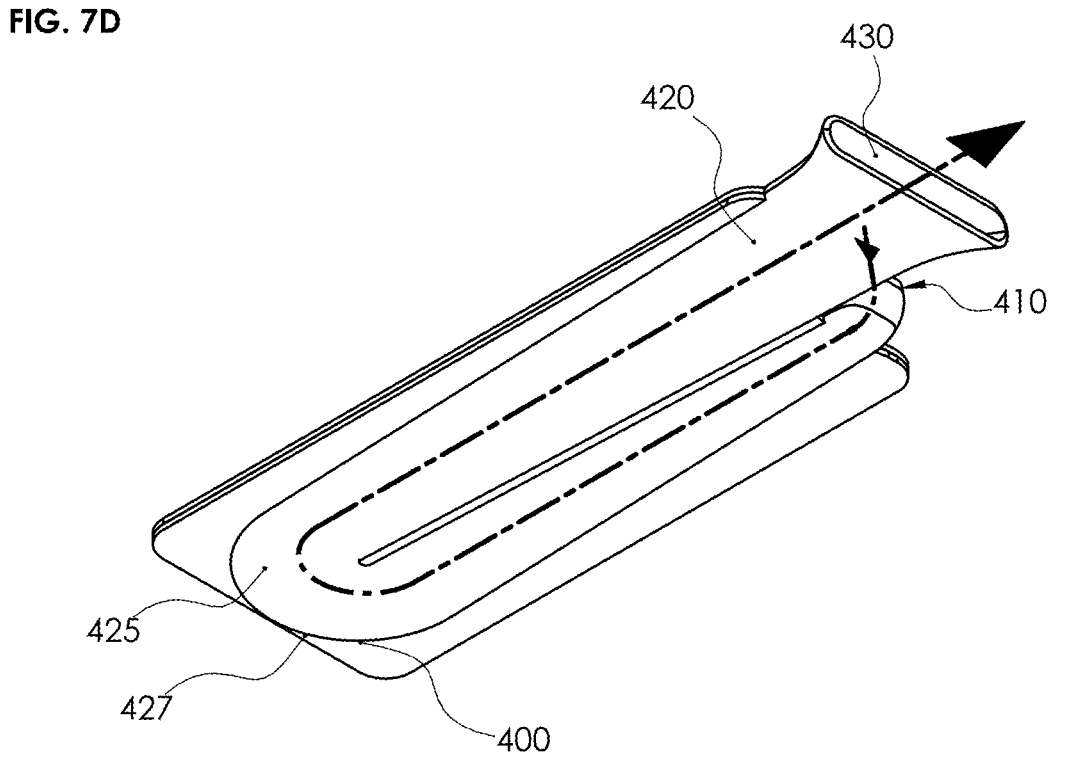

The FIGS. 7C and 7D shows a U-shaped sound tube, alternative to the use of the zig-zag type sound tube seen in FIGS. 7A and 7B. The FIG. 7C shows an isometric top front view of the sound tube type U 400, where the sound waves 405 enter the input port 410, hit an inclined surface 415, directing them along the interior of the sound tube. U-type sound 400 from the front 420 to the rear 425, makes a 180° turn 427 and returns to the mouth 430. The sound tube has an initial width 422 of between 10 mm and 20 mm, with a preference of 15 mm, which increases along its path, reaching a final width 424 of between 40 mm and 50 mm, with a preference of 45 mm, at the mouth 430 of the U-shaped sound tube; Likewise, this tube 400 has a height of between 3 mm and 7 mm, with 5 mm being preferred, and the total length of the wave path is between 400 mm and 600 mm, with 500 mm being preferred. The FIG. 7D is the bottom isometric front view of the U-type sound tube 400; where it is shown how the sound waves 405 coming from the input port 410, travel inside the U-type sound tube 400 from the front 420 to the rear 425 of the sound tube, make a 180° turn 427 and they return to the front of the sound tube 400.

Figure 7E:
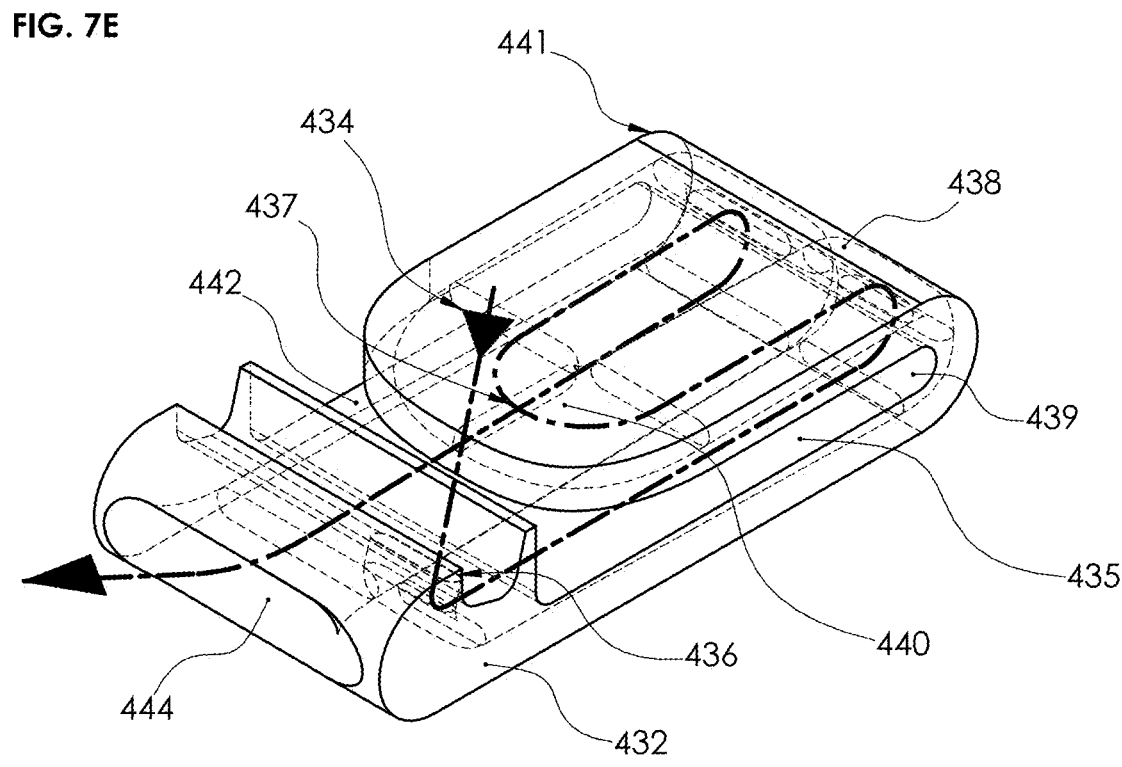
FIG. 7E and FIG. 7F are the isometrics top and bottom views, respectively, showing other alternative of a longer U-type sound tube included in this invention.
Figure 7F:
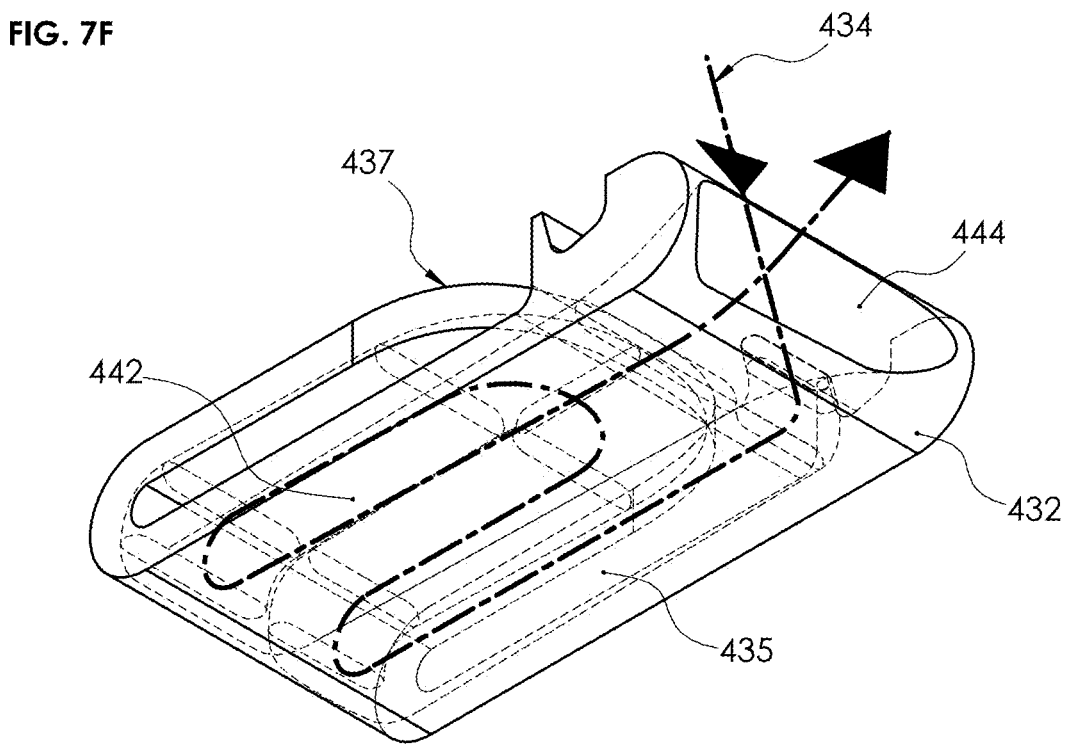

FIGS. 7E and 7F show another alternative to the u-type sound tube shown in FIGS. 7C and 7D. The FIG. 7E shows a top front isometric view of this alternative, where sound 434 enters to the sound tube 432 through input hole 436. The sound is conducted through the bottom right section 435, to the rear area 439 of the sound tube 432, and makes a 180° turn upwards 438 where it returns for a short distance, makes a 180° turn to the right 437 again in a backwards direction, and with another downward 180° turn 441, the sound is conducted through the lower left section 442 of the sound tube 432 to be ejected through the front outlet grille 444. This U-type sound tube alternative has a length of between 500 mm and 700 mm, having 600 mm as preferred. FIG. 7F shows a bottom isometric view showing the sound path through the sound tube.

Figure 7G:
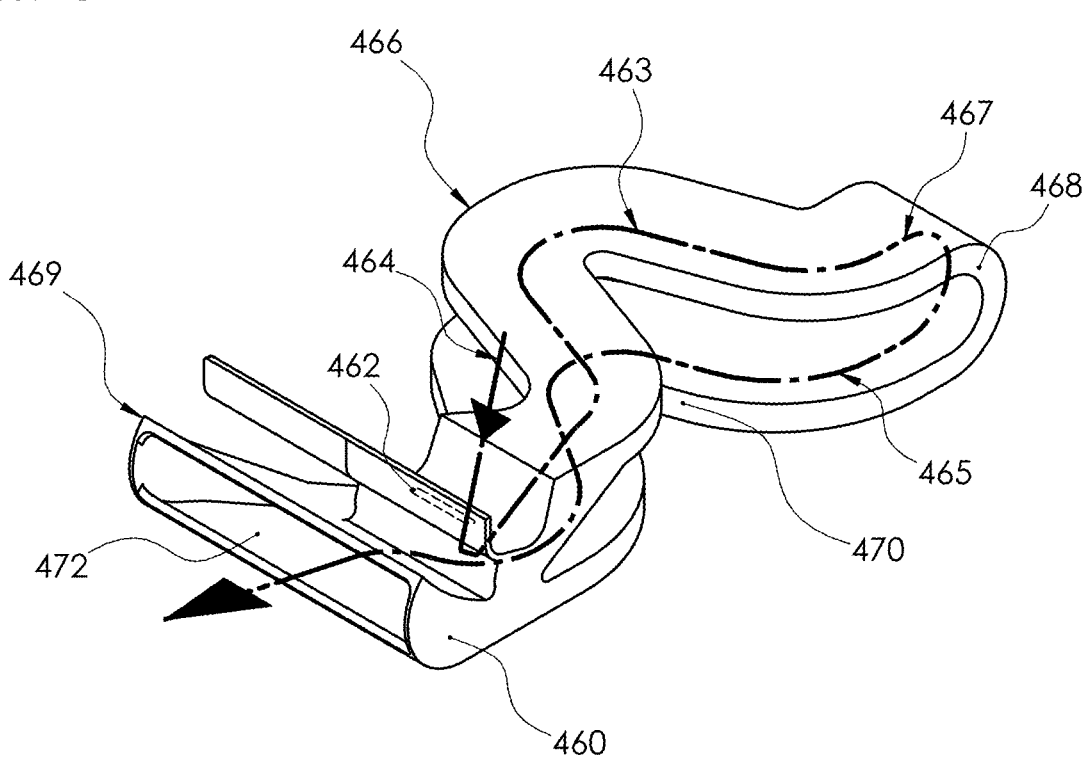
FIG. 7G and FIG. 7H are the isometrics top and bottom views, respectively, showing other alternative of the zig zag-type sound tube included in this invention.
Figure 7H:
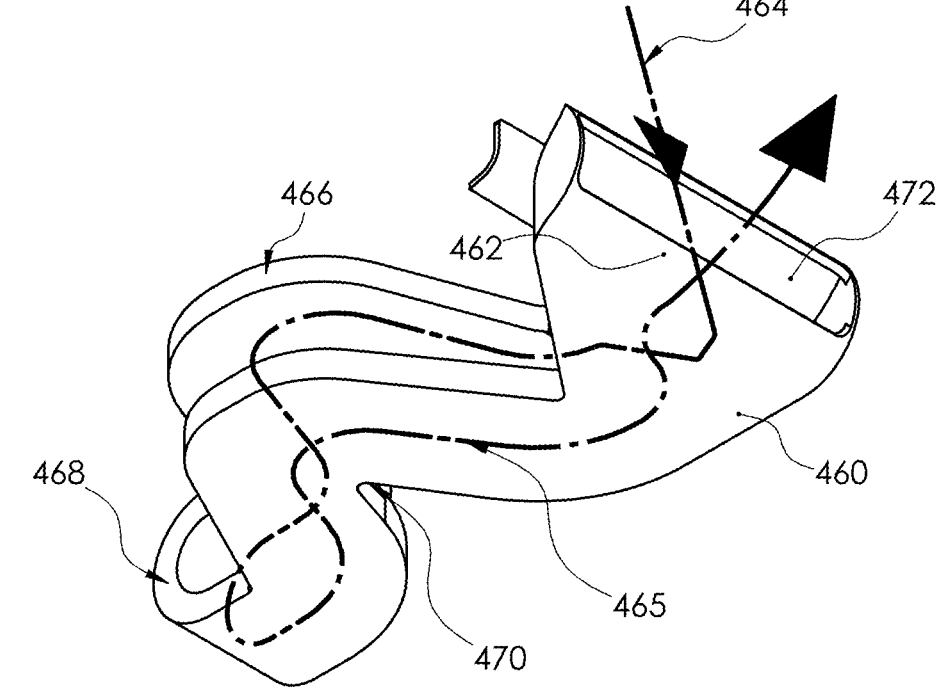

FIG. 7G shows the top front isometric view of an alternative to the zig zag-type sound tube 460 design shown in FIGS. 7A and 7B, where the angle of the zigzag curves 466 and 470 of the sound tube path is less than 180°, (between 120° and 150°) with which a more fluid sound path inside the sound tube 460 is achieved. Similar to the zigzag-type sound tube shown in FIGS. 7A and 7B the sound 464 enters the sound tube input hole 462, and follows a zigzag path 463 to the rear area 468 where it makes a 180° downward turn 467 and returns to the front part 469 following a zigzag path 465 and being expelled through the exit grille 472 of the front part 469 of the sound tube 460, the FIG. 7H shows this same trajectory from a front bottom isometric view.

Figure 8:
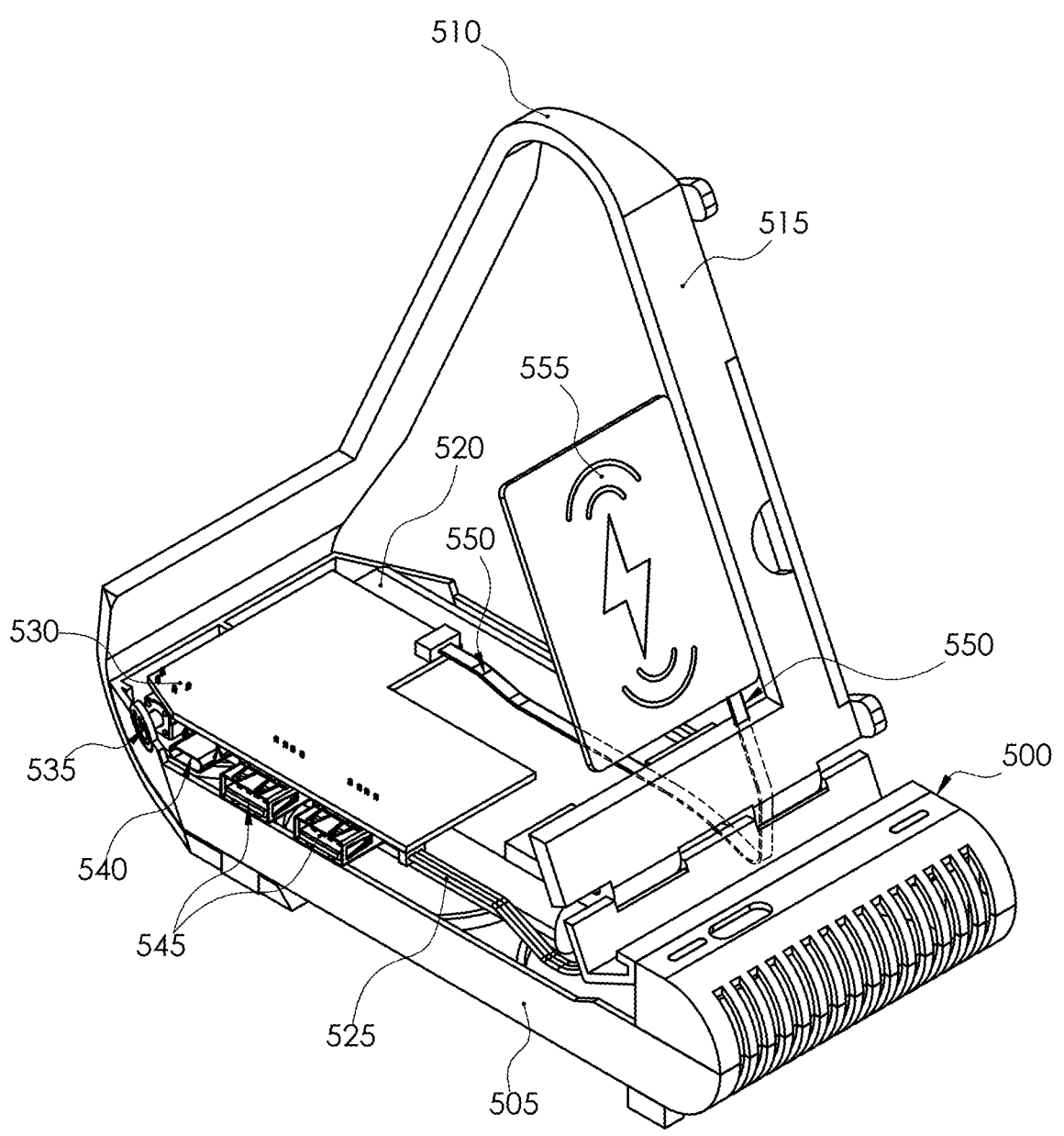
FIG. 8 is a section view showing the internal set of electronics of this invention.

FIG. 8 is an isometric view of this invention 500 showing the detail of the electronic components of the wired and wireless power bank function. Inside the main body 505 of this invention 500 is the rechargeable Lithium-ion or other type of rechargeable battery 520 with a capacity of between 5,000 mAh and 30,000 mAh, having a 10,000 mAh as preferred, which is connected by means of a cable 525 to the PCB 530 that controls the charging and discharging of said battery 520. Included on PCB 530 are an on/off button 535 with an LED indicator showing battery charge level, power input port 540 which can be USB-C type preferably, USB-A, Micro USB or Lighting type, with which it is possible to charge the rechargeable battery 520 inside this invention 500 by connecting it via cable either to another device such as a laptop, or by using an A/C adapter to connect it to an electrical outlet or other power source. Included on PCB 530 are 2 or more USB-A output or other type of ports 545 to which other devices can be connected to provide charging from the rechargeable battery 520 built into this invention 500. Connected to this PCB 530 by means of a flex cable 550, is a Qi or similar type of wireless antenna 555 that is located in section 3 515 of the outer charging cover 510 to provide fast wireless power charging of 15 W or higher charging capacity to the smartphone or device compatible with this type of charging feature that is placed close to the wireless antenna 555.

Figure 9A:
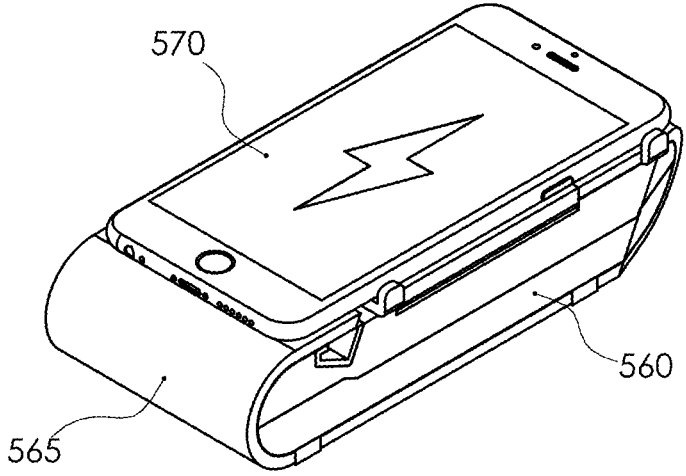
FIG. 9A and FIG. 9B show isometric views of this invention being folded and unfolded, respectively, with a phone charging wirelessly.
Figure 9B:
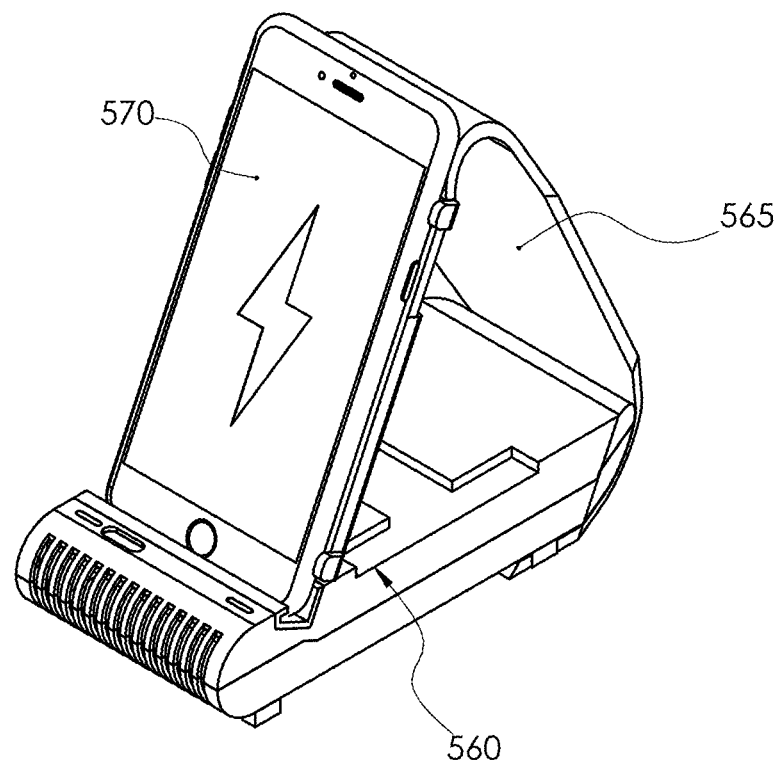

FIG. 9A shows an isometric view of this invention 560 with the outer charging cover 565 in closed position. In this position is possible to wirelessly charge a smartphone 570 or other similar device with wireless charging capabilities just by placing it onto this invention 560 and turning On the On/Off switch 535 described in FIG. 8. In FIG. 9B, this invention 560 is shown with the charging cover 565 unfolded, in vertical tilted position, which allows the smartphone 570 to be used and its screen viewed easily, while charging wirelessly.

Figure 10A:
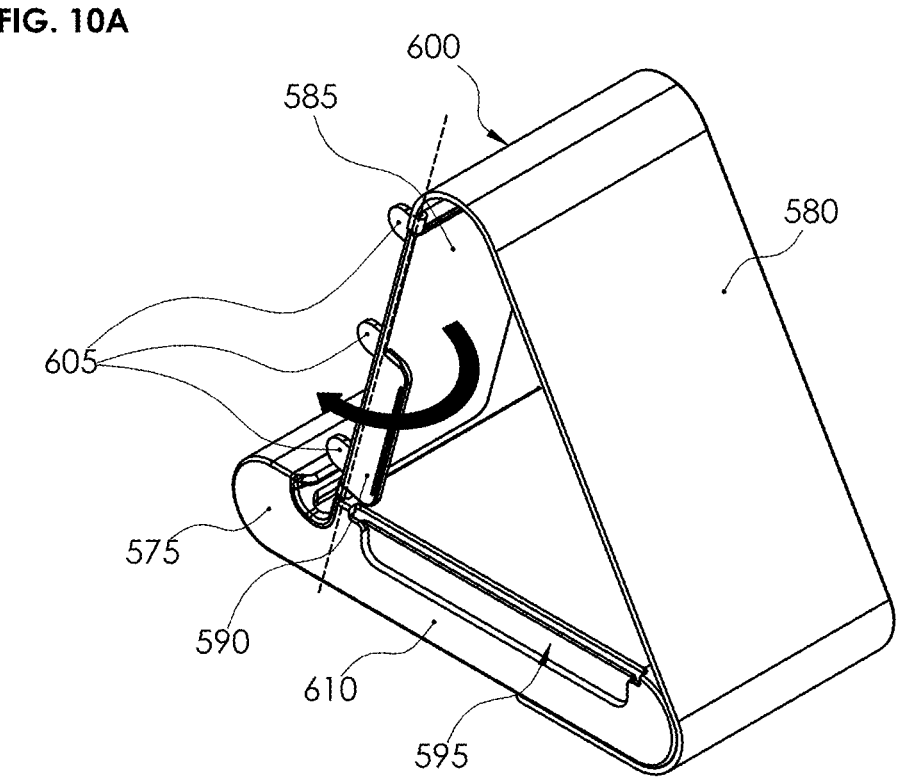
FIG. 10A shows an isometric back view of the present invention and the unfolding method to deploy the lateral phone stand.
Figure 10B:
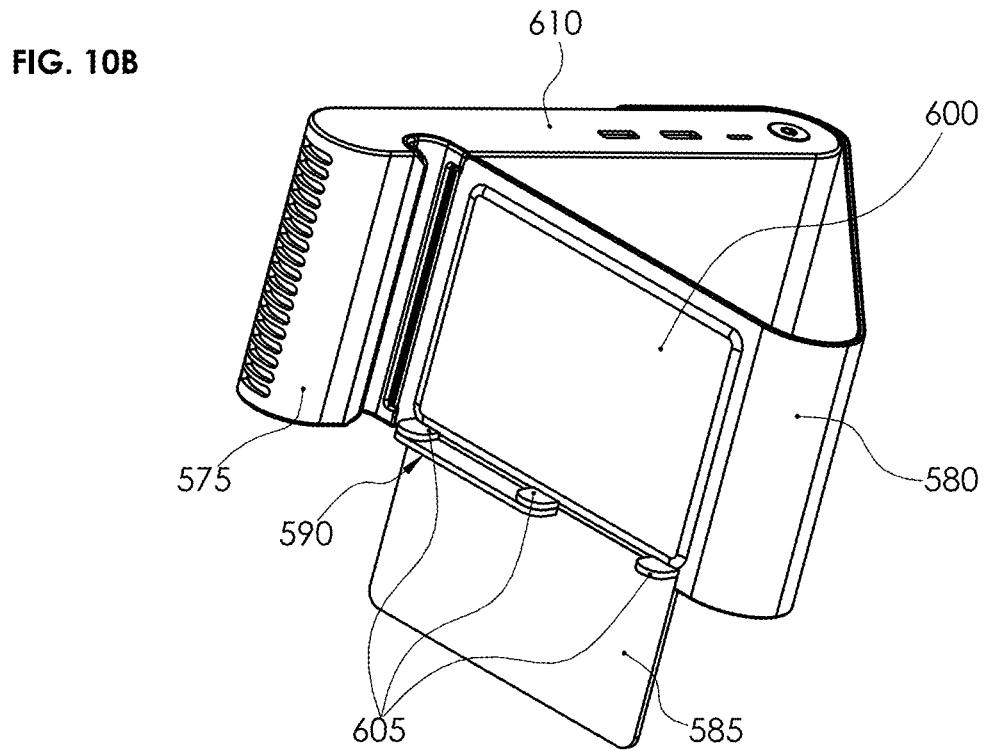
FIG. 10B shows the isometric view of this invention with the lateral phone stand deployed for use in landscape or tilt mode.

FIG. 10A is a rear isometric view showing this invention 575 in a vertical tilted position with the outer charging cover 580 unfolded. In this view can be seen a support flap 585 which unfolds from the rear of section 3 600 of the outer charging cover 580, rotating 180° outwards, functioning as a support to place this invention 575 on landscape or tilted position, taking an angle of approximately 65° to the back side (for instance, a deck) to give a comfortable viewing of the smartphone screen by the user. Support flap 585 includes a support tab 590, that, when rotate it, reach and touch the support pins 605, where the smartphone or other accessories rests when placed on this invention 575 in landscape mode, and restricts the rotation of the support flap 585 to 180°, maintaining the tilt position of this invention 575. Support tab 590 stores inside pocket 595 of main body 610, when outer charging cover 580 is fully folded. FIG. 10B shows how the support flap 585 touches the support pins 605 when rotated, holding this invention 575 in a tilted position, raising this invention at the front for a more comfortable viewing angle of the smartphone or other connected apparatuses by user. The support flap 585 would be built of one frame, or multiple frames attached by flexible plastic material. Like the ones commonly used in the market for tablet covers.

Figure 11A:
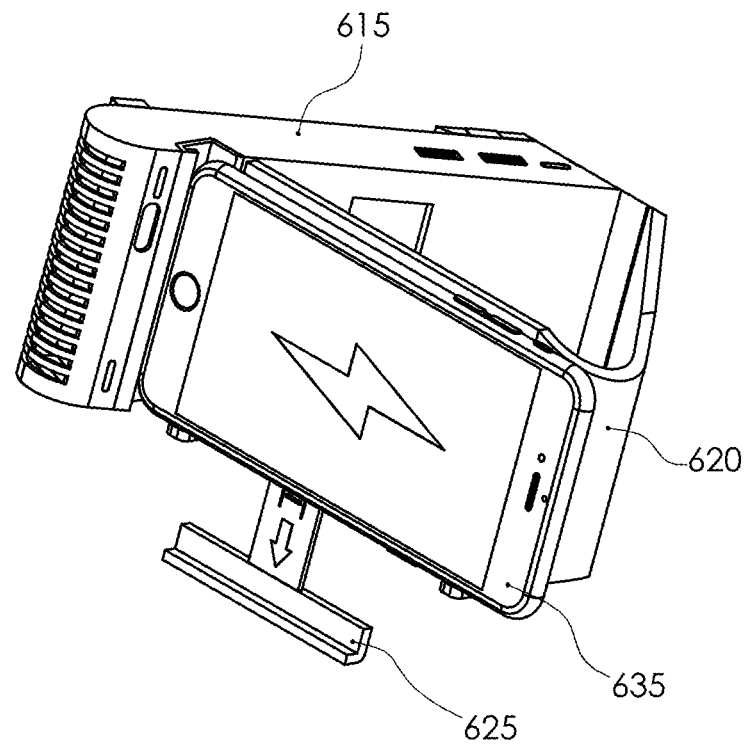
FIGS. 11A and 11B show isometric views of the present invention in use, with the lateral telescopic support arm and alternatively with a folding support flap, respectively, positioned horizontally tilted with a phone mounted.
Figure 11B:
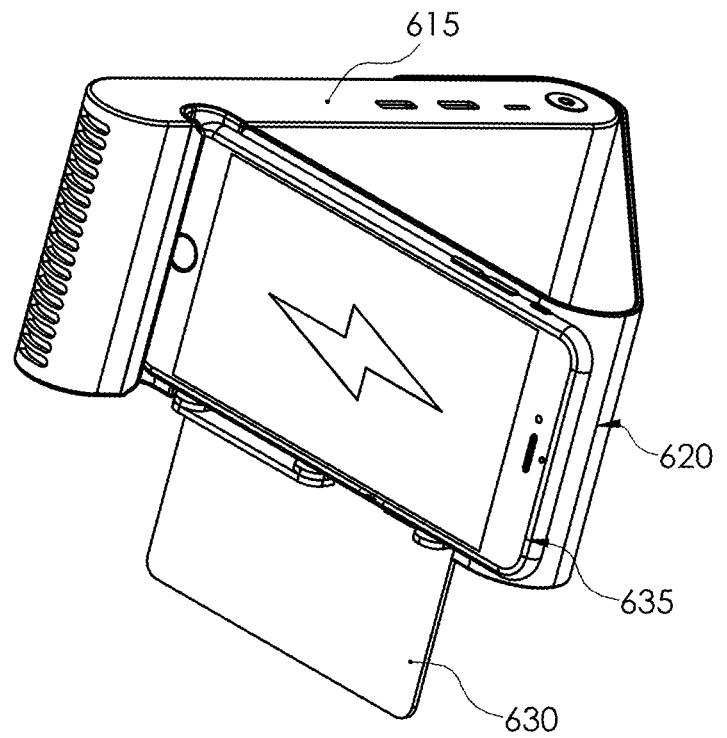

In FIG. 11A shows an isometric view of this invention 615 version, with the unfolded outer charging cover 620, including a lateral telescopic arm 625 with a smartphone 635 mounted on it. This side arm allows this invention 615 to be placed in landscape or horizontal tilted position, and the height can be adjusted to control the viewing angle and allow the user to view the smartphone screen 635 or other connected apparatus more comfortably. FIG. 11B is an isometric view of this invention 615 and its outer charging cover 620 deployed but including a folding flap stand 630 version. The folding flap stand 630 unfolds 180° from the inside of the outer charging cover 620 and serves as a support to raise the smartphone, giving it a comfortable viewing angle when this invention 615 is placed in tilt mode.

Figures 12A, 12B:
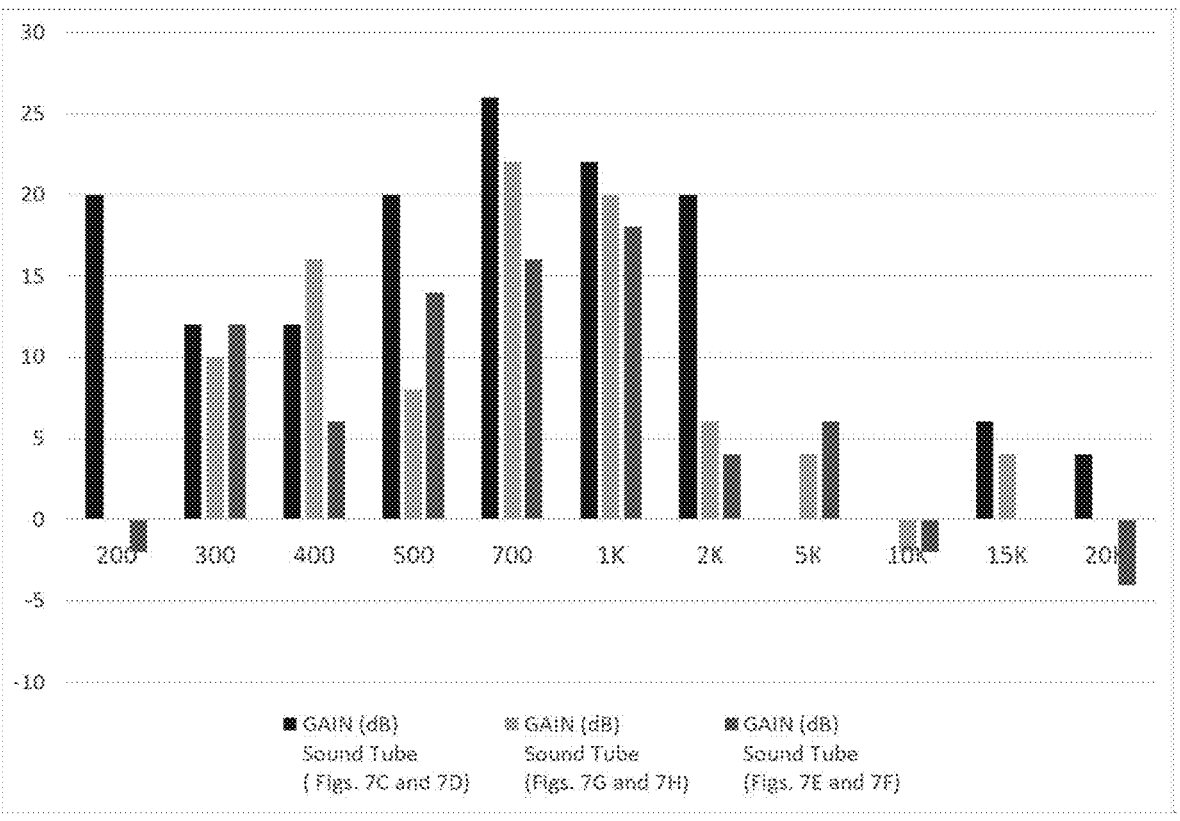
FIG. 12A and FIG. 12B show the table and the graph, respectively, with the data of the gain in decibels obtained in the tests of the sound tubes in the anechoic camera.

The FIG. 12A shows the table and 12B shows the graphs with the resulting data of the tests in an anechoic chamber, carried out on the sound tubes shown in the FIGS. 7C thru 7H, included in this invention, taking the measurements at a distance of one meter. Initially, the measurements were made with a Samsung S10+ smartphone at full volume and without any type of amplification, to obtain the reference data and determine the magnitude of the amplification achieved with this invention. Measurements were then made using the same telephone at full volume, connected to the sound tube designs shown in FIGS. 7C to 7H. The results show an average gain for frequencies between 300 Hz and 1 kHz, of 18.4 dB for the sound tube design shown in FIGS. 7C and 7D, 13.2 dB for the sound tube shown in FIGS. 7E and 7D, and 15.2 dB for the design of FIGS. 7G and 7H.

Figure 13A:
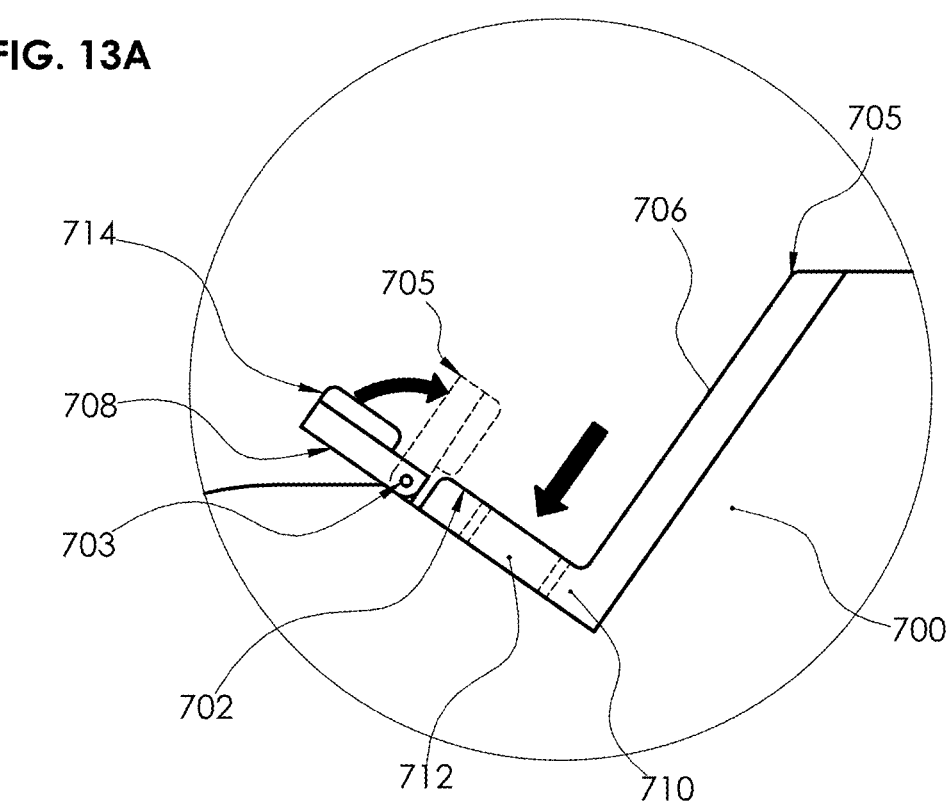
FIGS. 13A and 13B show the detail of a sealing mechanism option in the support slot of this invention.
Figure 13B:
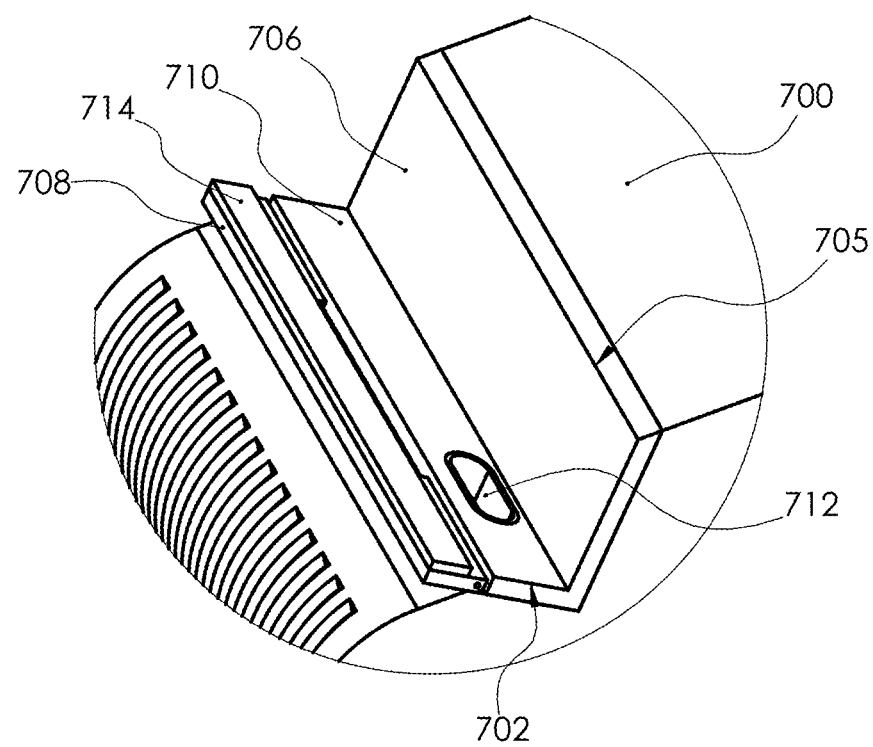

The FIGS. 13A and 13B show the side and front isometric view of the detail of a scaling mechanism option in the support slot of this invention. When placing a smartphone in the support slot 702 of this invention 700, the speaker of the smartphone aligns with the sound input hole 712, creating a hermetic union to ensure that there are no pressure losses in the sound coming from the phone's speaker. The rotating support wall 708, which is attached to the support slot 702 by a hinge-type mechanism 703, when lifted presses the phone against the support back 705. The rotating support wall 708 is secured by a locking pin system, or it is held vertically by means of a spring or using some type of hinge that maintains its position. The FIG. 14B shows how the surfaces of the support slot 702, the rotating support wall 708, and the support back 705 have coatings 706, 710 and 714 in an elastic material that can be, foam, silicone, rubber or another similar, which conforms to the shape of the telephone and hermetically seals the faces around the speaker to maintain the pressure of the sound emitted by the telephone speaker and directing it into the sound tube, through the inlet hole 712 of this invention 700.

Figure 14A:
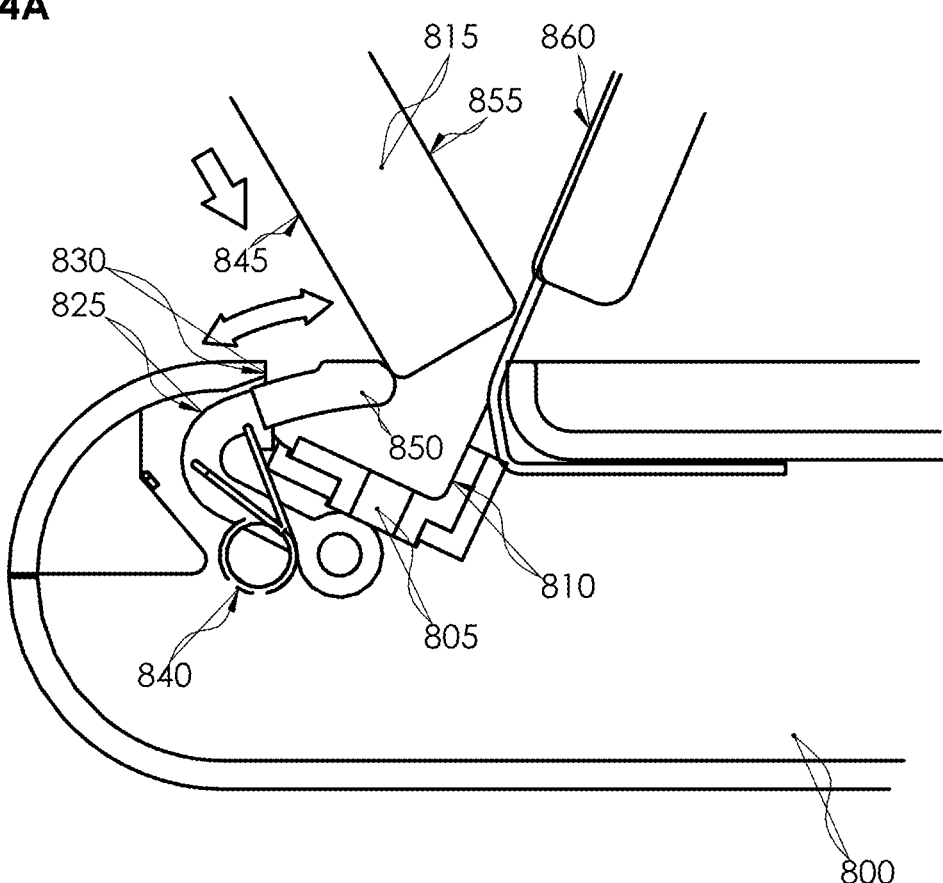
FIGS. 14A and 14B show a locking system integrated on the support base of this invention.
Figure 14B:
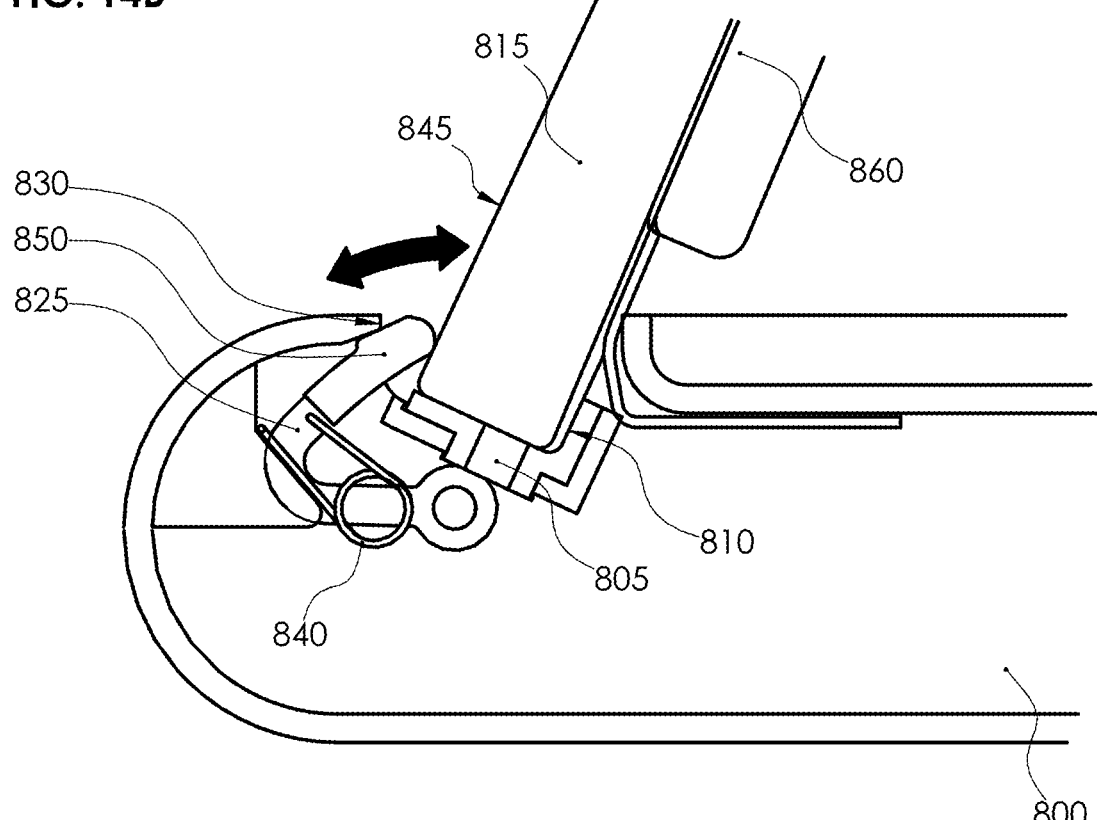

The FIGS. 14A and 14B show the locking system located on the support base 810 of this invention 800. FIG. 14A shows a locking system that guarantees that a smartphone 815 maintains a firm position when it is installed on the support base 810 of this invention 800 maintaining an adequate seal between the speaker of said smartphone 815 and the input hole of the sound tube 805 included in this invention. This system has a locking lever 825 located on the internal front face 830 of the support base 810 of this invention, which rotates on an axis 835 that allows it to be inserted inside the support base 810. It has an spring 840 that causes the locking lever 825 to return to its initial extended position, outside the support base 810. The smartphone 815 must be inserted diagonally into the support base 810 so its front part 845 touches the front part 850 of the locking lever 825, and then the smartphone 815 is pushed so that the rear part 855 of it rests on the cover unfolded 860 and later it is pressed downwards to locate it in its final position. FIG. 14B shows how the Smartphone 815 is supported by the locking lever 825 where the spring 840 ensures that said lever 825 exerts sufficient pressure to keep it in position with adequate sealing to prevent sound leaks between the speaker of the smartphone and sound input 805 of this invention 800

Figure 15A:
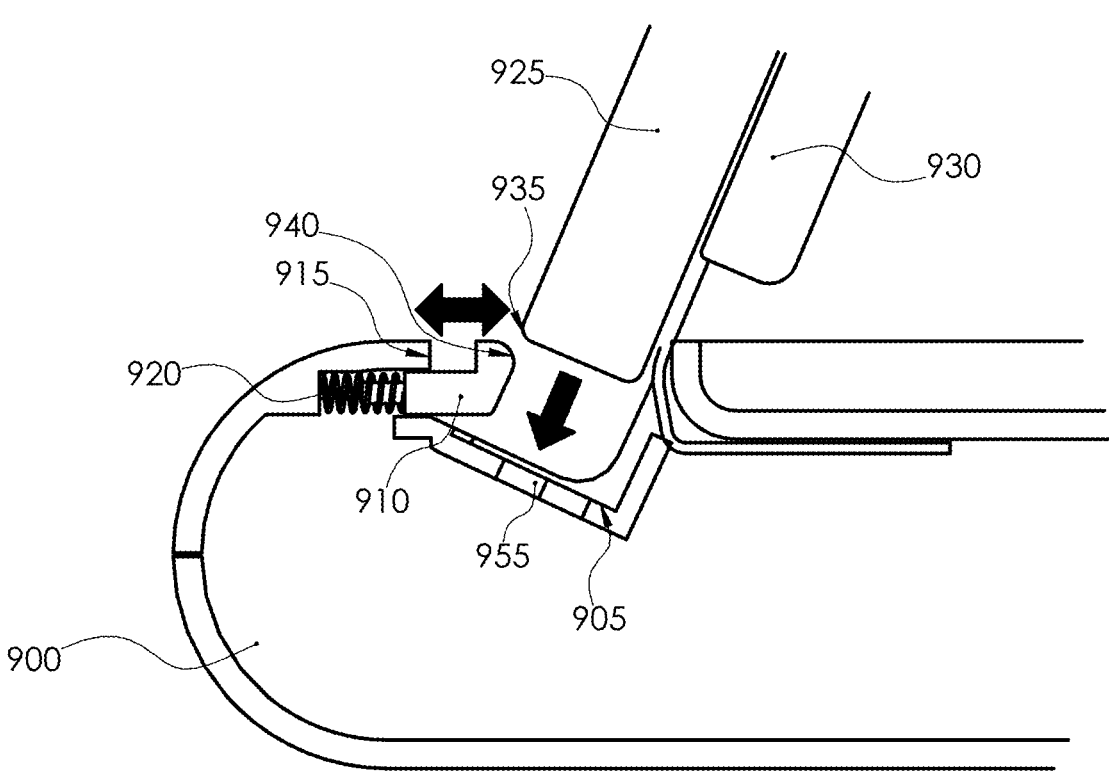
FIGS. 15A and 15B show an alternative to the locking system integrated in the support base of the invention.
Figure 15B:
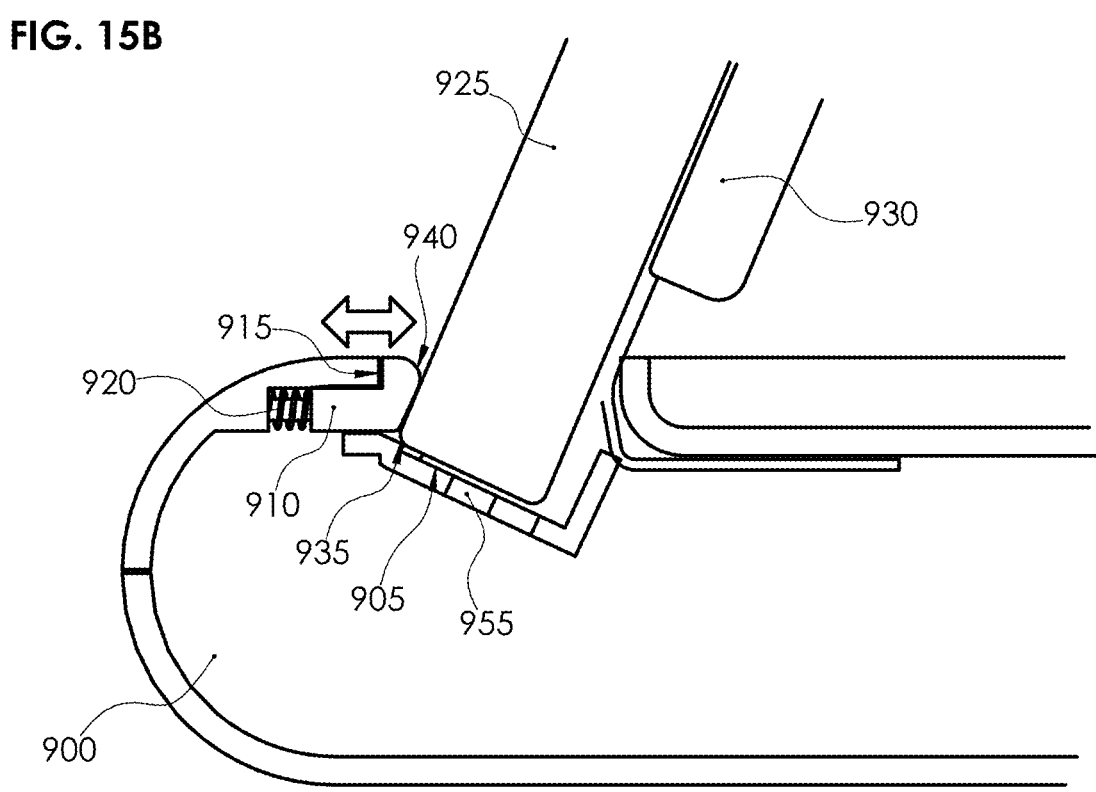

The FIGS. 15A and 15B show an alternative to the locking system integrated in the support base 905 of this invention 900. FIG. 15A shows a sealing button 910 on the front face 915 of the support base 905, which moves horizontally from and towards the interior of said support base 905 and which has a spring 920 that keeps it always extended outwards. To install a smartphone 925, it is placed parallel to the angle of the unfolded outer charging cover 930, this mechanism allows the smartphone to be installed from any angle, and moves downward, the lower front edge 935 of said smartphone 930 makes contact with the rounded edge 940 of the sealing button 910 moving this button towards the inside of this invention 900, as the smartphone 925 continues to lower, the sealing button 905 is pushed out by the spring 920, exerting a slight pressure on the front of the smartphone 945, securing it and keeping it in position, with a suitable seal to prevent sound leaks between the telephone speaker and the sound input 955 of this invention 900. FIG. 15B shows this alternative of the locking system with the smartphone installed in this invention.

Figure 16A:
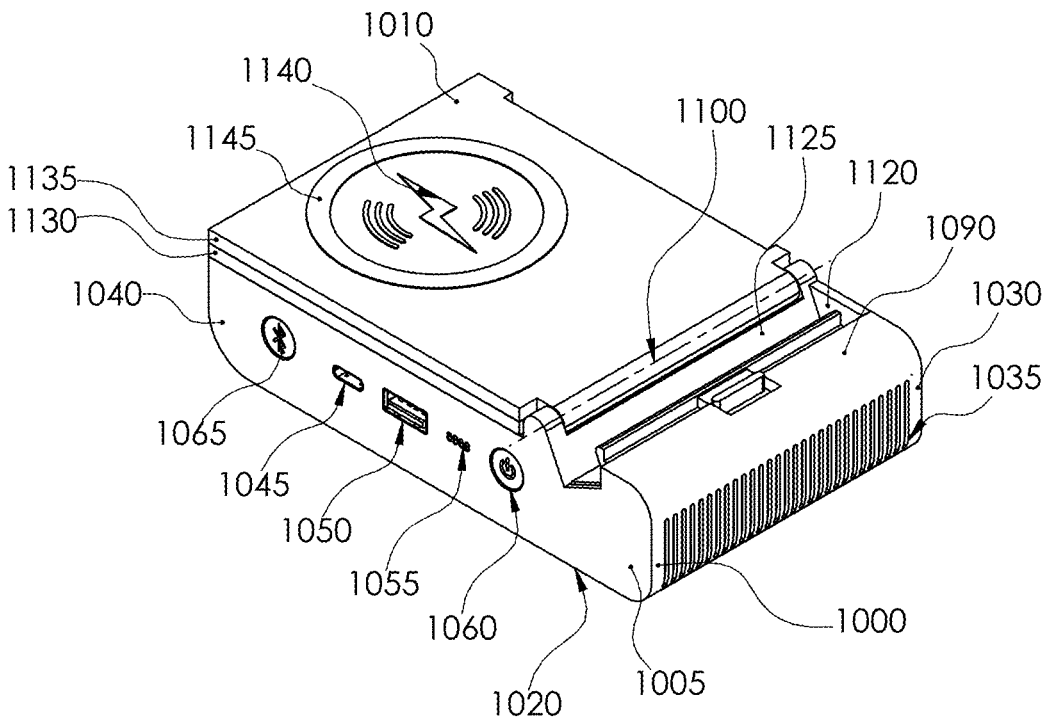
FIG. 16A shows a front left isometric view of a wireless charging cap and bluetooth version of the invention in the closed position.

FIG. 16A shows the front left isometric view of another embodiment of the invention. This present invention 1000 is mainly made up of a base 1005, a wireless charging cap 1010, and a support flap (see 1015 in FIG. 16B). Inside the base 1005, the electrical and electronic components that provide the charging and energy storage functions are located, and also contains a sound tube in charge of the passive amplification of the volume of the cellphone speakers in the mechanical version of this invention.

Figure 16B:
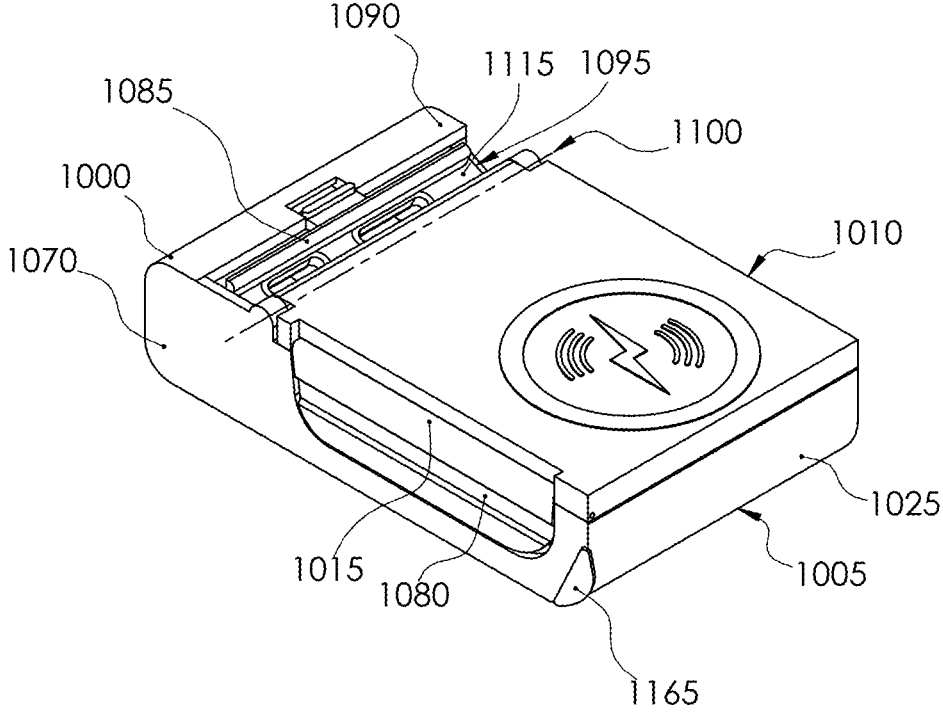
FIG. 16B shows a right rear isometric view of a wireless charging cap and bluetooth version of the invention in the closed position.

The base 1005 is made up of a front wall 1030 that includes a grill 1035 for amplified sound output; a left side wall 1040; an upper wall 1195 as described in FIG. 16B; a bottom face 1020, a rear wall 1025 described in FIG. 16B; and a right-side wall 1070 described in FIG. 16B.

On the left side 1040 are located, but not limited to, the USB Type C 1045 connection port for power input and battery charging (see FIG. 20 and FIG. 22), which also serves as an output for charging other devices, one or more USB type A 1050 or similar output ports for charging other devices; LED indicators for the charge level of the batteries 1055; the on/off button 1060 of this invention; and the bluetooth button 1065 for an electronic version of this invention 1000.

The wireless charging cap 1010 comprises a lower cover 1130 in which the wireless charging antenna 1140 is located, a magnetic ring 1145 for adherence to the phone; and a 1135 top cover to close the 1010 wireless charging cap.

FIG. 16B shows the right rear isometric view of this invention 1000, where the right-side face 1070 of the base 1005 and the cellphone support flap 1015 are shown. On the upper face 1090 of the base 1005 there is a support slot 1095 for the cellphone, where slot 1095 is formed by a lower face 1115, a right side stop 1120 described in FIG. 16A that serves to align and support the phone to this invention 1000, and the rear face 1125, preferably angled, described in FIG. 16A. In the upper part there is also the locking bar 1085 that presses the phone towards the rear face 1125 of FIG. 16A keeping it in a firm position and attached to this invention 1000 in different positions. The diagonal surface 1165 is the location where this invention rests in its back side when is placed in an inclined position (see 1247 in FIG. 18). The wireless charging cap 1010 rotates in the axis of rotation 1100 on the base 1005. The cellphone support flap 1015 includes a U-shaped slot 1080 more widely described in FIG. 19B.

Figure 17A:
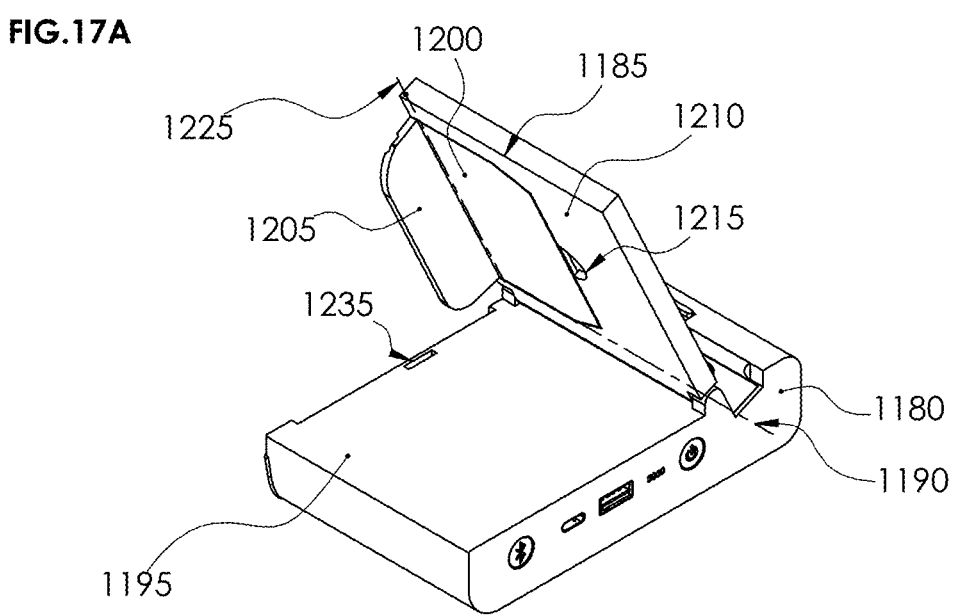
FIGS. 17A and 17B show left rear isometric views of a wireless charging cap and bluetooth version of the invention, with the support flap deployed.

FIG. 17A shows a left rear isometric view of this invention 1180 with the wireless charging cap 1185 deployed. The wireless charging cap 1185 rotates on the axis 1190 at an angle between 0 degrees to 90 degrees, with the preferred value being 65 degrees with respect to the upper face 1195 of this invention 1180, allowing the wireless charging cap 1185 to remain magnetically or mechanically attached to the phone to provide wireless charging. In this view, the support flap 1200 is folded, and can extend at 90 degrees with the cellphone support base 1205, forming a single piece that rotates on the rotation axis 1225. The rear cover 1210 of the wireless charging cap 1185 includes an indentation 1215 that allows to manually peel off the support flap 1200 from the wireless charging cap 1185.

Figure 17B:
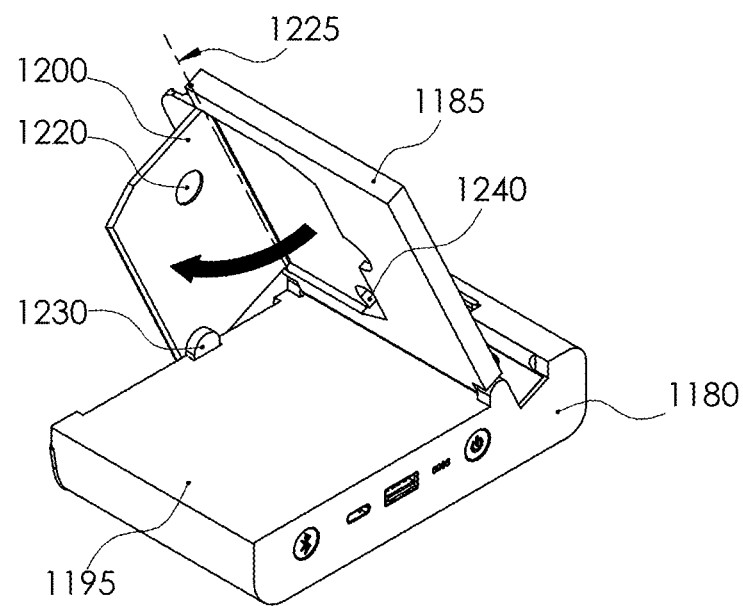

FIG. 17B shows how the support flap 1200 rotates on the axis 1225 and unfolds approximately 90 degrees with reference to the wireless charging cap 1185, until the protrusion 1230 of the support flap 1200 engages in the cavity 1235 shown in FIG. 17A. When the support flap 1200 is folded to the wireless charging cap 1185, the protrusion 1230 fits into the cavity 1240 of the wireless charging cap 1185 of this invention 1180.

The support flap 1200 includes a metal or magnetic plate 1220 that is attracted to, the magnetic ring 1145 included into the wireless charging cap 1185 and seen in FIG. 16A.

The top cover 1195 includes internally another metallic piece that is attracted by the magnetic ring 1145 of the wireless charging cap 1185, and. when both parts are close, the magnetic attraction will keep this invention in closed position.

Figure 18:
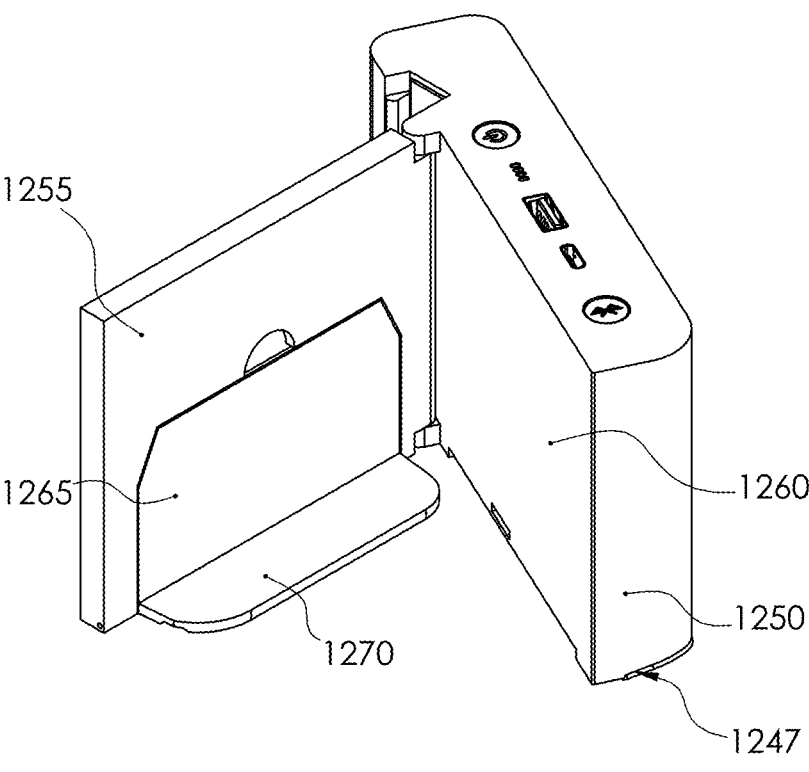
FIG. 18 shows a left rear isometric view of a wireless charging cap and bluetooth version of this invention, unfolded in a horizontal position.

FIG. 18 shows a rear isometric view of this invention 1250 in a horizontal position, with the wireless charging cap 1255 unfolded approximately at 65 degrees with respect to the top cover 1260 of this invention 1250. In the horizontal position of this invention 1250, the support flap 1265 remains folded to the wireless charging cap 1255, and the cellphone support base 1270 provides a support surface and provides stability of this invention 1250 in said position.

Figure 19A:
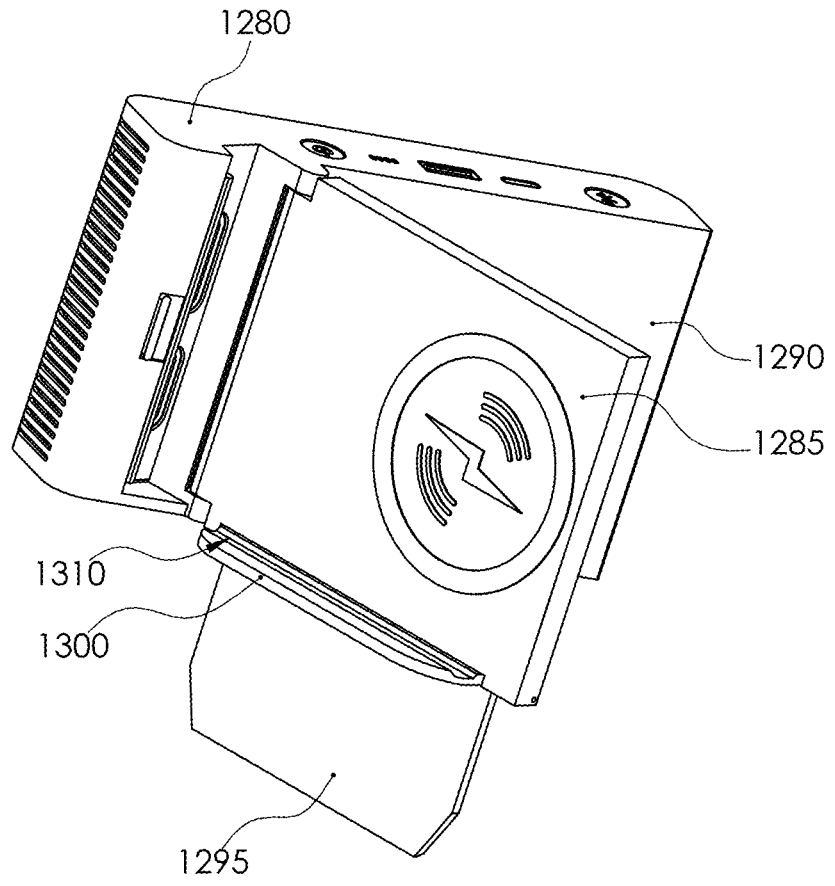
FIG. 19A shows a right front isometric view of a wireless charging cap and bluetooth version of this invention deployed in a tilted position.

FIG. 19A shows a front isometric view of this invention 1280 in a tilted position. This view shows the wireless charging cap 1285 deployed at approximately 65° to the top cover 1290 of this invention 1280, and the support flap 1295 deployed to an angle of approximately 180° to the rear of the wireless charging cap 1285.

Figure 19B:
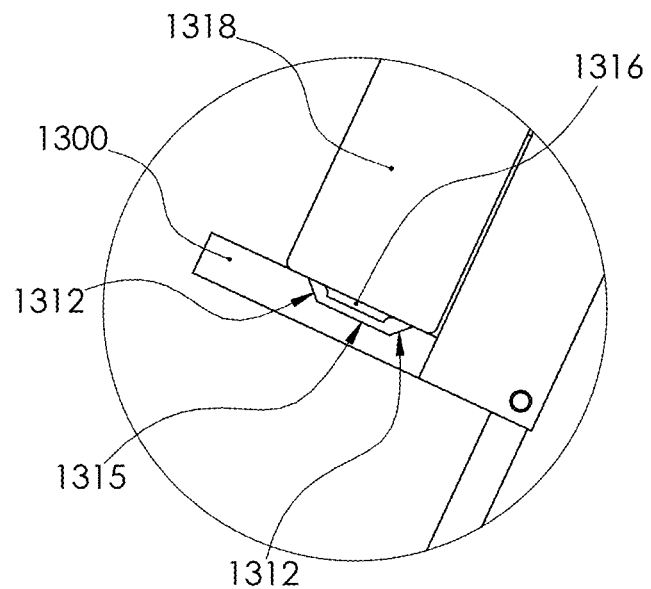
FIG. 19B shows a detail view of the cellphone support base of this invention.

FIG. 19B shows the detail of the cellphone support base 1300, which includes a U-shaped groove 1310 seen in FIG. 19A and is formed by two diagonal faces 1312 and a horizontal surface 1315, creating a hollow space that prevents the side buttons 1316 of the cellphone 1318 from being pressed when placing it on said cellphone support base 1300.

Figure 20:
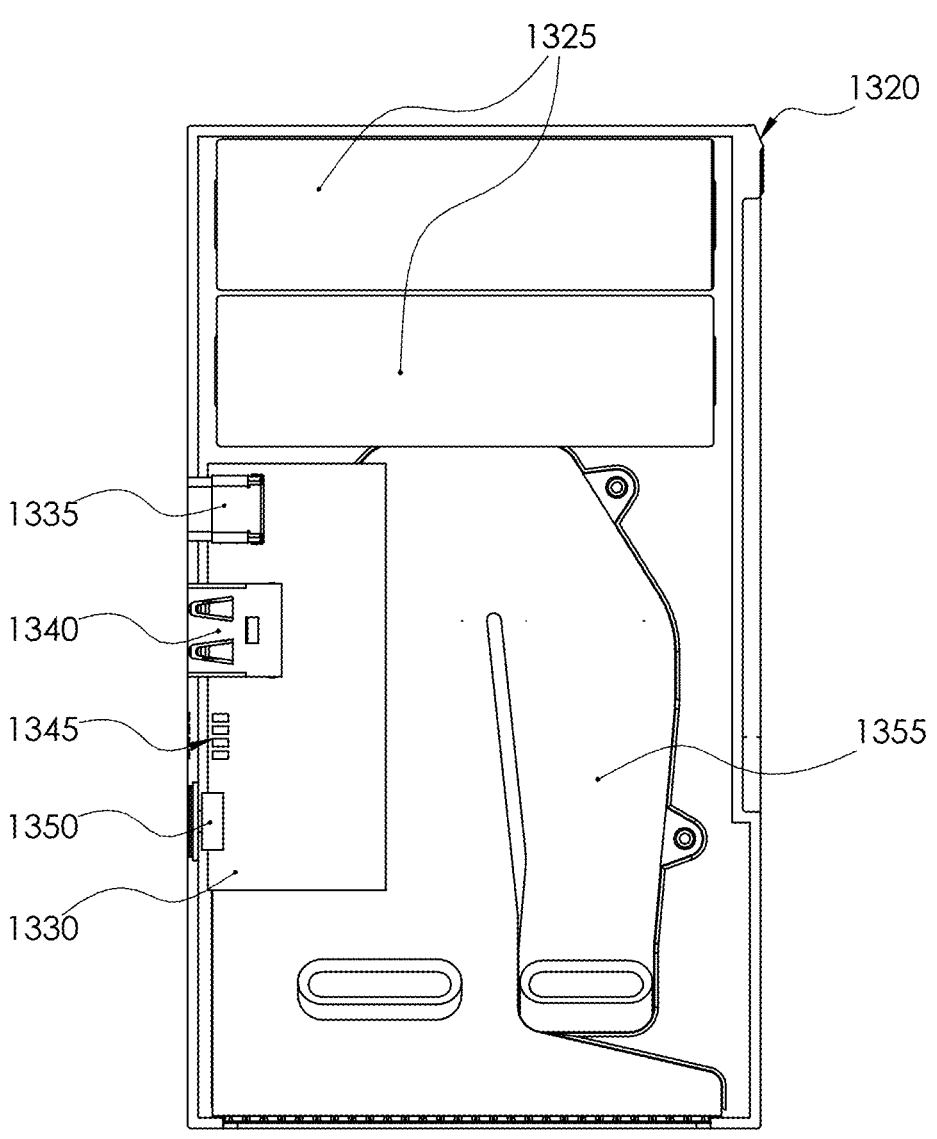
FIG. 20 shows the top view of the internal electronic and mechanical layout of a version with a sound tube of this invention.

FIG. 20 shows the top view of an internal layout embodiment of the electronic and mechanical components of this invention 1320. This version includes, but is not limited to, 2 rechargeable cylindrical lithium batteries 1325 or similar, with a capacity of between 1000 to 20000 mAh each, with the preferred value being 5000 mAh each, which are connected to the power management PCB 1330 that controls battery charging and discharging, the wireless charging antenna, one or more power input and output ports USB-C type 1335 or similar, one or more USB-A power output ports 1340 or similar, the charging indicator LEDs of the rechargeable batteries 1345. The power button 1350 enable the wireless charging feature of this invention 1320. This and other versions of this invention, without limitation, may include other type of ports, such as for data transfer. A partial view of a passive sound amplification tube 1355 is shown.

Figure 21:
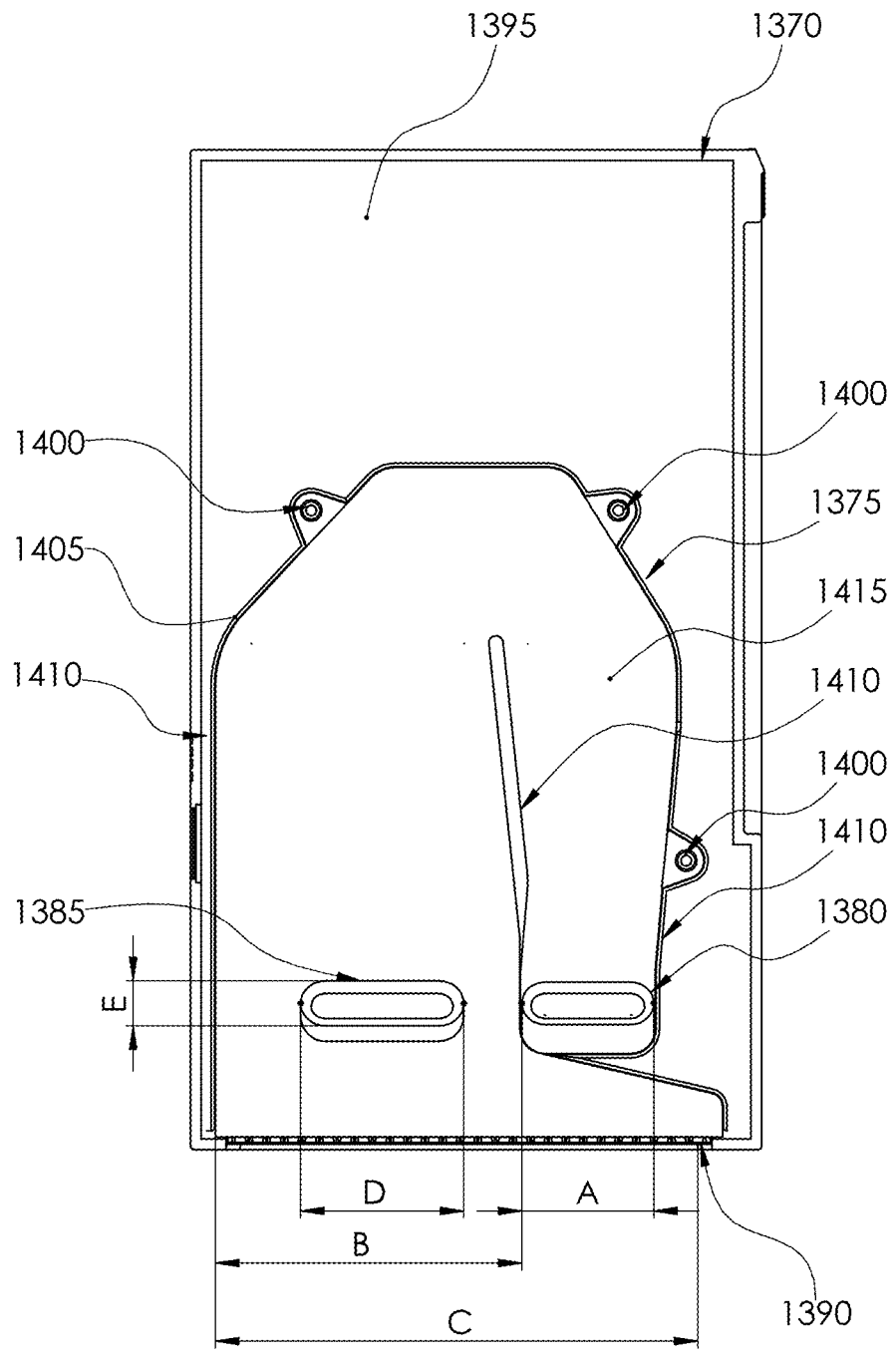
FIG. 21 shows the top view of the sound tube of a version with wireless cover of this invention

FIG. 21 shows the top view of the passive sound amplification tube 1375 included in the FIG. 20 version of this invention 1370. The sound amplification tube 1375 has a sound inlet hole from the smartphone speaker 1380, a sound inlet hole for the cellphone microphone 1385, and an outlet opening for the sound tube 1390 of this invention 1370. The sound tube 1375 consists of side walls 1410 that form the path and height of the sound tube. The height of the sound tube starts at a height of between 3 mm to 5 mm, with 4 mm being preferred, and ends at a height of between 15 mm to 20 mm, with 17.5 mm being preferred. The starting width A of the 1415 sound tube starts between 12 mm and 20 mm, with 16 mm being preferred, and the sound tube grows both longitudinally and in height, until it reaches a finishing width B of between 35 mm and 50 mm, with 40 mm preferred before reaching the exit opening C of the sound tube 1390, where it widens from 50 mm to 80 mm, with 68 mm preferred. The length E of the holes 1380 and 1385 are between 3 mm to 6 mm, with 4 mm being preferred, with a width of D.

The two lower side walls 1410 of the sound tube 1375 may form part of the lower cover 1395 of this invention 1370. The upper cover 1415 of the sound tube 1375 mounts over the lower side walls 1410, and is secured by the retaining pins 1400. Sealing the sound tube 1375 is key to maintaining pressure within the tube and increasing the decibel gain of the sound, so, a sealing adhesive or glue 1405 (but not limited to) can be added between the sound tube cover 1415 and the sound tube side walls 1410.

The sound tube 1375 redirects the sound emitted by the smartphone speakers towards the sound tube output port 1390, and passively increases the volume gain of the cellphone by 5 to 15 decibels at frequencies of between 200 to 20,000 hertz from a preliminary test with a sound level application.

Figure 22A:
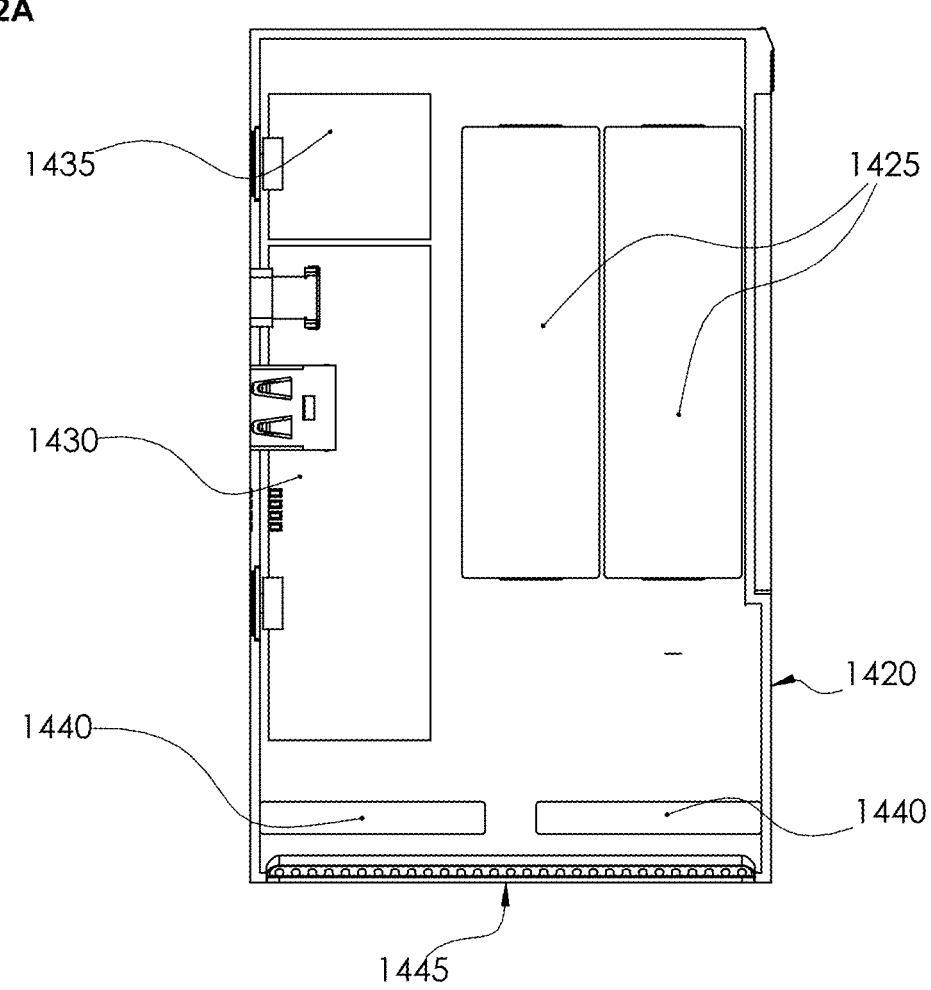
FIG. 22A shows the top view of the internal electronic and mechanical layout of a bluetooth version of this invention.

FIG. 22A shows the top view of an internal layout of the electronic and mechanical components of this invention 1420 with the use of electrical speakers 1440, instead of a passive sound tube. This version includes, but is not limited to, 2 rechargeable cylindrical batteries 1425, which connect to the power management PCB 1430, which in turn connects to the bluetooth—or similar for wireless sound management—PCB 1435. The 1435 bluetooth PCB includes the antenna and all the electronics that allow it to be detected and paired with other devices such as cellphones, tablets, etc., and emit the sound through the sound output opening 1445 of this invention 1420. The embedded software programming included on PCBs 1430 and 1435 will enable bluetooth pairing of this invention 1420, and will control the signal emitted to one or more of the front speakers 1440 that output the sound through the sound output opening 1445 of this invention 1420.

Figure 22B:
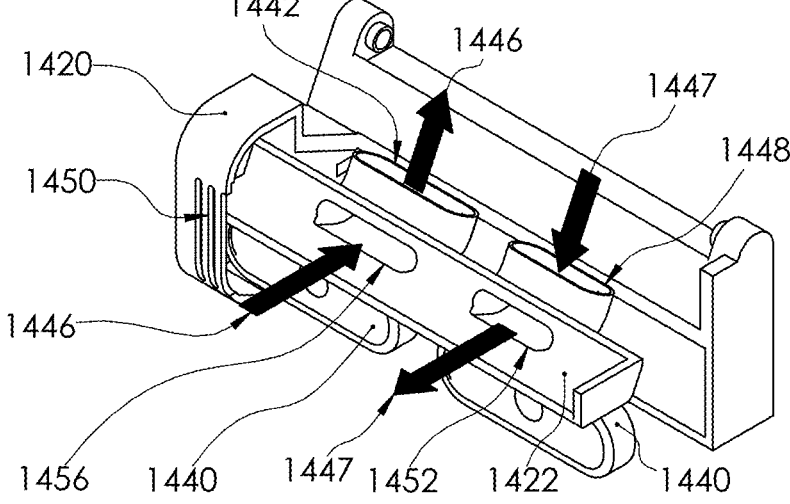
FIG. 22B shows a sound redirector of the bluetooth version of this invention.

FIG. 22B shows an option of a sound redirector 1422 of an electronic version of this invention 1420. The sound redirector 1422 is located on the front area of this invention, immediately after and in a fixed position behind the front grill 1450 and above the electrical speakers 1440. The sound that comes out of the cellphone speaker 1447 enters through first port 1448 of the sound redirector 1422 and goes through a short J-shaped tube directing the waves towards the front of this invention 1420 through second port 1452. The sound 1446 that enters through the third port 1456 of the sound redirector 1422, enters the microphone of the cellphone through fourth port 1442. The microphone cellphone echo canceling feature will allows to eliminate the received noise from the same cellphone speaker.

Figure 23A:
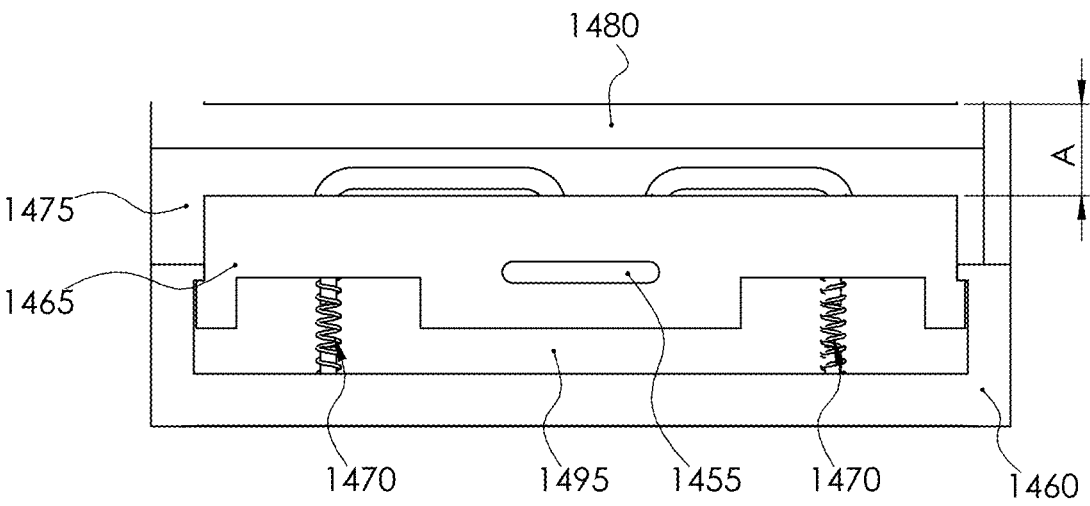
FIGS. 23A and 23B show a locking bar operating mechanism included in this invention.

FIG. 23A is a cutaway top view of the front side of this invention 1460 showing details of the displacement of the locking bar 1465 that secures the phone in the holder slot 1475. The locking bar 1465 has springs 1470 that keep it extended outward by maintaining a distance A from the rear support 1480 of the support slot 1475.

Figure 23B:
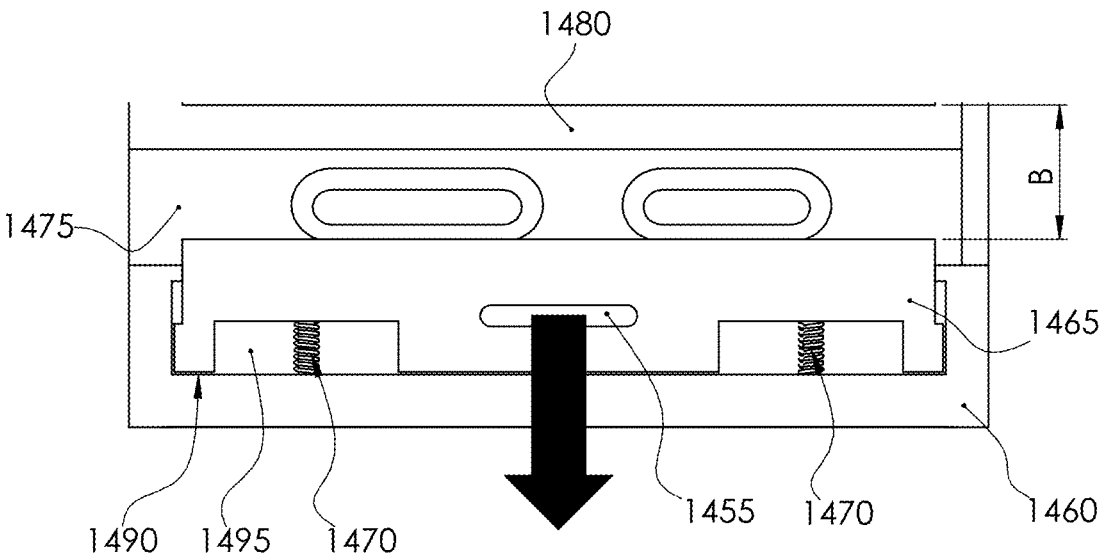

FIG. 23B describes that inserting a cellphone into the support slot 1475, forces the locking bar 1465 to move back a distance B by compressing the springs 1470 against the rear wall 1490 of the cavity 1495. The locking bar 1465 will press the cellphone against the rear support 1480 of the support slot 1475 and help hold it in place at that point without any difference as to which position this invention 1460 is placed in. When removing the cellphone from the support slot 1475, the springs 1470 return the locking bar 1465 to its position as the unpressed position A. It is also possible to move the locking bar 1465 by manually pulling forward with a finger on the protrusion 1455, which is an integral part of the 1465 locking bar.

Figure 24A:
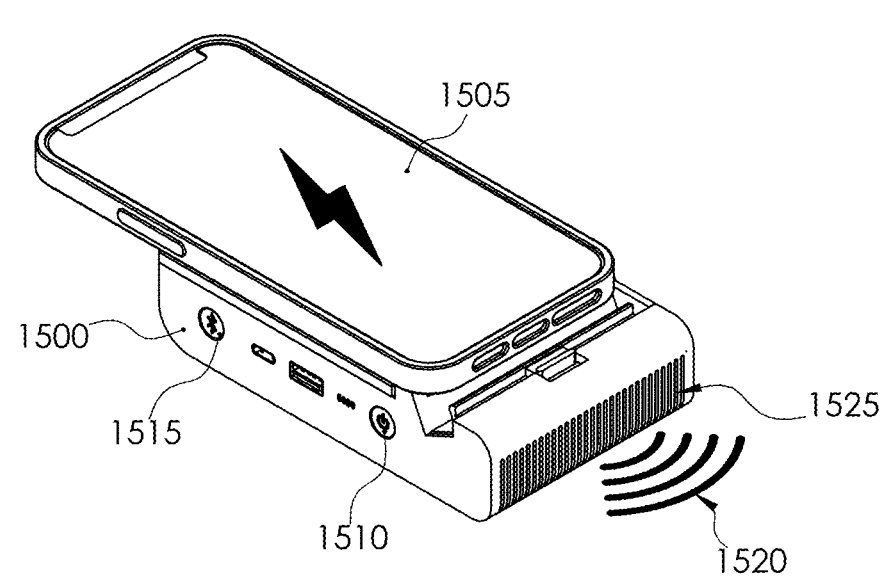
FIGS. 24A and 24B show isometric views of the bluetooth version of this invention in the closed and vertical position, respectively.
Figure 24B:
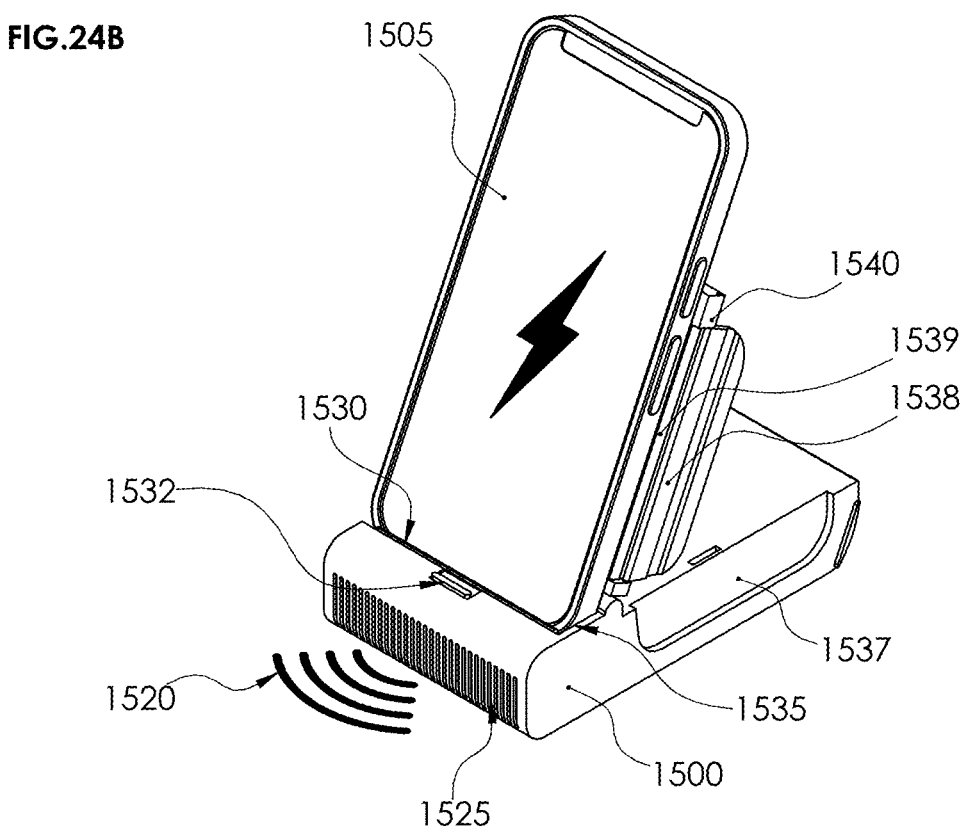

FIGS. 24A and 24B show this invention in the closed and vertical positions, respectively. FIG. 24A shows a smartphone 1505 placed on top of this invention 1500. When the power button 1510 is pressed, the wireless charging function of this invention is activated. Cellphones and other apparatuses can also be charged wired using, but not limited to, the USB-C and USB-A charging ports included in this invention 1500. Pressing the bluetooth button 1515 activates this functionality of the invention 1500, thereby a smartphone 1505 or any other device not physically connected to this invention can be paired to emit the its sound 1520 through the front grill 1525, and redirect it towards the front of this invention 1500.

FIG. 24B shows this invention 1500 in the vertical use position. A cellphone 1505 can be installed by pressing it directly onto the support slot 1535, or it is also possible to manually move backwards the locking bar 1530 by pulling the slide button 1532 as explained in FIG. 23A. The wireless charging cap 1540, which rotates on the axis 1100 described in FIG. 16A, is manually lifted and when approaching the rear cover of the smartphone 1505 enables the possibility of wireless charging of the cellphone 1505. The support base 1538 of the cellphone 1505 can rotate about the axis 1225 of FIG. 17B and stop when it touches the right-side face 1539 of the wireless charging cap 1540. This design serves to use this invention 1500 in the tilted position of use as described later in FIG. 25B.

Figure 25A:
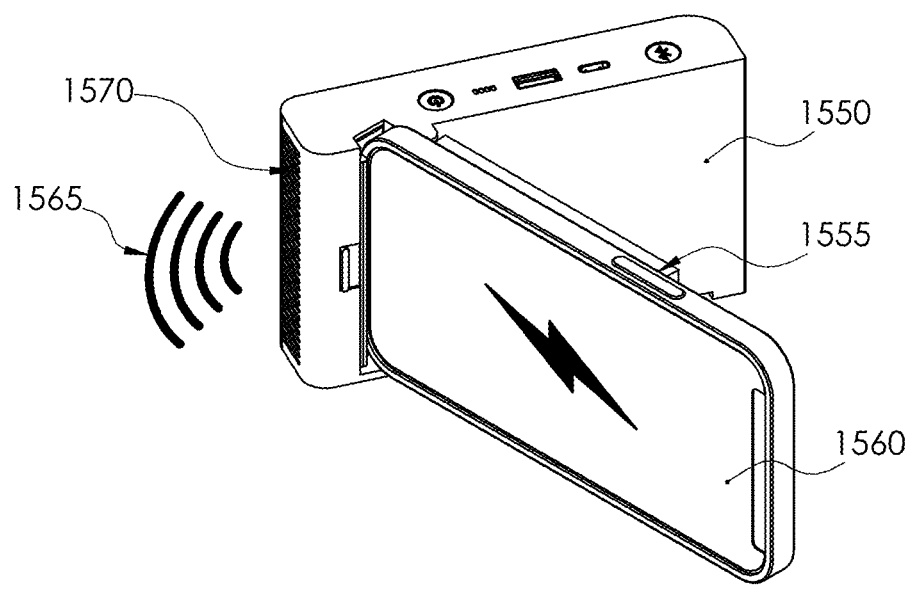
FIGS. 25A and 25B show isometric views of the bluetooth version of this invention in a horizontal and tilted position, respectively.
Figure 25B:
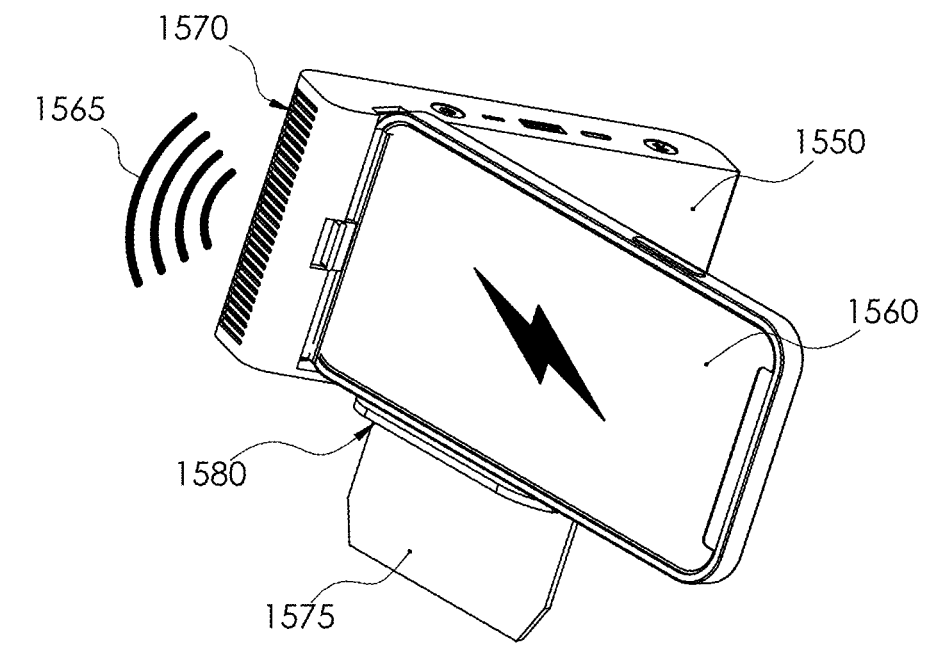

The FIGS. 25A and 25B show the use of this invention 1550 in the horizontal and tilted positions of use, respectively. FIG. 25A shows the isometric front view of this invention 1550 in a horizontal position, with its wireless charging cap 1555 unfolded at approximately 65 degrees and attached to a smartphone 1560. The sound 1565, both in the sound tube version of FIG. 20, as in the electronic version of FIG. 22 of this invention 1550, will exit through the front grill 1570. In FIG. 25B, this invention 1550 is shown with the tilt support 1575 deployed 180 degrees from the wireless charging cap 1555 of FIG. 25A. The 1560 smartphone rests on the cellphone support base 1580 which includes a U-shaped slot (see 1310 of FIG. 19A) that prevents the side buttons of the cellphone 1560 from being pressed by the cellphone support base 1580, and thus the smartphone 1560 remains stable and firm for use in the inclined position.

In FIGS. 26A, 26B and 26C a comparison of this invention is shown in its different, but not limited, configuration options.

In FIG. 26A is an embodiment of the invention 1600 in the version with the drop-down cover and a passive sound tube as described in FIGS. 1A through 11B.

In FIG. 26B this invention 1605 is shown in the version with a wireless charging cap and a sound tube—as specifically described in FIG. 21, which can be between 20% and 35% less long A than the drop-down cover model 1600, having 28% shorter length as preferred, and between 20% to 35% lighter, with 25% lighter weight preferred.

In FIG. 26C the invention 1610 is shown in the bluetooth version specifically described in FIG. 22A, which can be between 30% and 40% less long than the drop-down cover model 1600, with a 32% as preferred shorter length, and lighter weight between 20% and 35% lighter than the drop-down model 1600, with 25% lighter weight being preferred.

Some of the usage options of the present invention are described herein. The present invention is a portable thin sound amplifier with power bank hub system that incorporates the flexibility to transport and install different brands of smartphones and other apparatuses combining sound amplification and power charger all-in-one portable and small technological case.

The internal and external structures are designed to house electronic boards and connectors of the latest technology that manages, interfaces and/or detects the power obtained from a computer, A/C adapters, or other power sources, and charge apparatuses, wired or wirelessly.

Some of uses of this invention are the following:

1. Power Bank with wireless and wired connectivity: to charge smartphones, tablets and other apparatuses that has wireless charging capabilities, by simply placing them onto this invention in horizontal position, or in the front port in vertical or horizontal tilted position, or connecting them by cable through the USB-A, USB-C, or other type of power output ports included in this invention. This invention can transfer power to the USB power output ports in different ways: i) when this invention is wired connected to a computer by a type-c or other type of cable, or ii) when this invention is connected to an external A/C adapter (110/220 volts), or iii) when this invention is using the power stored in the rechargeable battery installed inside this invention acting as a power bank. The present invention can be produced with different type of connectors depending on the common technologies such as, USB-C, Thunderbolt, etc. Also, there is a possibility to produce the present invention with magnetic and removable adaptors to connect different type of smartphones, such as Android or Apple among others.

2. Passive Sound Amplifier: using a small special thin sound tube to mechanically increase between 10 to 20 decibels the sound emitted by the apparatuses connected in the support slot of this invention. This invention includes a horn antenna amplifier architecture to increase the sound pressure level of the seated smartphone into the support slot. The smartphone internal transducer surface diameter being utilized is typically small and has a high acoustic impedance which when subjected to a normal open-air environment, spreads without any impedance or direction control. Alternatively, this invention can include speakers to increase the volume of the apparatuses. It should be noted that the present invention can be used simultaneously as a power bank and as a sound device/sound amplification device for one or more devices at the same time.

The inventions described in FIG. 16A and later, allow this invention to be used in all positions using just one hand, unlike some of the designs included in FIG. 15B may require two hands for deployment.

It is convenient to be able to use a product with one hand, as it offers greater versatility and comfort for the user. The inventions described in FIG. 16A and later, allow the user to: a.) flip the invention on the right side face and connect the cables in the ports on the left side face; b.) place the cellphone on the top of the invention and press the wireless charging button to charge the cellphone; c.) press the bluetooth button to search, pair, and activate the speakers of this invention (different seconds of pressing would be required for each function); from the normal closed position, insert a cellphone into the support slot, raise the wireless charging cap, and use the cellphone vertically while charging and amplifying its sound passively or with the speakers; d.) from the vertical use position, again with one hand, it can be turned 90 degrees to the right so that it is in a horizontal position; from the vertical position, user can unfold the tilt support flap located on the right side of the invention with one hand, and turn the invention to the right in an inclined position, being able to see the cellphone screen at about 25 degrees above the horizontal; e.) users have a new the option of using their cellphones by using this invention to improve their performance at work, in the study, and during gaming among others, at home or outside.

Description of Production

The multiple pieces of the outer shell of this invention, are made of acrylonitrile butadiene styrene (ABS) plastic that has been injection molded. Sections of the outer shell may also have an additional material such as thermoplastic polyurethane (TPU) or silicone. The power transfer port options would be done by using USB type C, USB2.0, HDMI, Thunderbolt, Qi, among other available wired and wireless technologies. All buttons, switches, electrical micro-switches (made of plastic and metal) are also commodity components that have been manufactured and/or sourced from other suppliers. Integrated circuits, chipsets and printed circuit boards (PCB) are also standard items, although different proposed functions of this invention may have proprietary chipsets designed, printed and programmed to fit the requirements of each peripheral function that is to be added to this invention.

The printed circuit board (PCB) on which the electrical and mechanical components are mounted is custom-made for the functional design of this invention peripherals. It is a flat, resin-coated sheet. Electrical resistors, capacitors, oscillators, integrated circuits (ICs), and other components are made of various types of metal, plastic, and silicon, also sourced from manufacturers that produce in mass.

The general sizes and dimensions available fall within the range of a top-end industrial design product that is available in the current market but may be produced slightly larger to accommodate for the added internal components that are built into this invention. The overall layout is similar as well, its orientation is symmetrical along a line that runs from the front to the back of the body of this invention along the top face. This invention has been detailed designed to obtain the smallest and carry-on size to allow for the addition of the proposed peripherals. On this invention, there are holes (See 240 and 245 in FIGS. 5A and 5B) molded in the shell (See 15 in FIGS. 1A and 1B) to allow for sounds to enter and leave the device via an internal specially designed thin sound tube (See 270 in FIG. 6). On the side there are: the activation button, an LED, and the power input and output ports of this invention.

The invention is not restricted to the details of the foregoing embodiments. The invention extends to any novel one, or any novel combination, of the features disclosed in this specification (including any accompanying claims, abstract and drawings), or to any novel one, or any novel combination, of the steps of any method or process so disclosed.

What is claimed is:

1. A portable sound amplifier with power bank system comprising:

a unitary hub device with an internal power source;

said hub device having a unitary body having a top wall, a bottom wall, a front wall, a rear wall, and a pair of side walls defining a cavity within said unitary body, said unitary body having an internal power source and a set of electronics for wireless and wired power charge capabilities with external devices;

said front wall having an opening for receiving a base piece into said cavity of said unitary body, said base piece having a bottom surface and a locking bar extending from said bottom surface;

said unitary body having a U-type sound tube extending from an interior top surface of said top wall into said cavity, defining an acoustic pathway;

said unitary body having a front output grill surface to allow amplified sound waves exit from said unitary body;

said hub device capable of data and power connection to a computer, smartphones, and other apparatuses simultaneously by at least one port;

said hub device having a mechanical port to install smartphones and other apparatuses for wireless power charge.

2. A hub device comprising:

a unitary body having a top wall, a bottom wall, a front wall, a rear wall, and a pair of side walls defining a cavity within said unitary body, said unitary body having an internal power source and a set of electronics for wireless and wired power charge capabilities with external devices;

said front wall having an opening for receiving a base piece into said cavity of said unitary body, said base piece having a bottom surface and a locking bar extending from said bottom surface;

said unitary body having a U-type sound tube extending from a first sound hole located on an interior top surface of said top wall into said cavity, said sound tube having sound tube side walls which form a height and width of said sound tube and defining an acoustic pathway; said sound tube having a second sound hole located on said top surface of said top wall of said cavity and an outlet opening;

said unitary body having a front output grill surface to allow amplified sound waves exit from said unitary body;

said hub device capable of data transfer and power connection to a computer, smartphone, tablet or other apparatuses simultaneously by at least one port.

3. The hub device of claim 2 wherein said hub device is used simultaneously as a power bank and a sound amplification device.

4. The hub device of claim 2 wherein said sound tube increases sound by 5 to 10 decibels at 200 to 20,000 Hz.

5. The hub device of claim 2 further comprising a sound redirector for directing sound through a plurality of ports.

6. The portable sound amplifier of claim 1 wherein said sound tube increases sound by an average gain of 18.4 decibels at 300 to 1 kHz.

7. The portable sound amplifier of claim 1 further comprising a sound redirector for directing sound through a plurality of ports.

8. The portable sound amplifier of claim 1 wherein said internal power source is a rechargeable battery.

9. The hub device of claim 2 wherein said sound tube side walls have a starting height of 3 mm to 5 mm.

10. The hub device of claim 2 wherein said sound tube side walls have an ending height of 15 mm to 20 mm.

11. The hub device of claim 2 wherein said sound tube has a starting width of 12 mm to 20 mm.

12. The hub device of claim 2 wherein said sound tube has an ending width of 35 mm to 50 mm.

13. The hub device of claim 2 wherein said outlet opening of said sound tube is 50 mm to 80 mm.

14. The hub device of claim 2 wherein said internal power source is a rechargeable battery.

15. The portable sound amplifier of claim 1 wherein said hub device further includes said internal power source connected to a power management PCB and a wireless sound management PCB connected to said power management PCB.

16. The hub device of claim 2 wherein said hub device further includes said internal power source connected to a power management PCB and a wireless sound management PCB connected to said power management PCB.

* * * * *